United States Patent [19]
Kawashima

[11] Patent Number: 6,128,023
[45] Date of Patent: *Oct. 3, 2000

[54] APPARATUS AND METHOD FOR EDITING CHARACTER TRAIN ON CAD PICTURE PLANE AND STORAGE MEDIUM STORING CAD CHARACTER TRAIN EDITING PROGRAM

[75] Inventor: Yoshihiro Kawashima, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/840,465

[22] Filed: Apr. 18, 1997

[30] Foreign Application Priority Data

Dec. 20, 1996 [JP] Japan .................................... 8-341509

[51] Int. Cl.[7] ...................................................... G06T 11/00
[52] U.S. Cl. .............................................................. 345/433
[58] Field of Search ................................... 345/433, 473, 345/419, 471

[56] References Cited

U.S. PATENT DOCUMENTS 5,138,698  8/1992  Aldrich et al. ........................... 345/419
5,539,868  7/1996  Hosoya et al. .......................... 345/471
5,741,136  4/1998  Kirksey et al. ......................... 345/473

Primary Examiner—Mark R. Powell
Assistant Examiner—Huedung X. Cao
Attorney, Agent, or Firm—Staas & Halsey

[57] ABSTRACT

A plurality of character train primitives existing on a CAD picture plane can be simultaneously inputted and edited on a document picture plane and character trains are inputted and edited. A character train converting module converts the character train primitives on the CAD picture plane into the character train on the document picture plane and displays. On the contrary, the character train converting module converts the character train on the document picture plane into the character train primitives on the CAD picture plane and displays. While the character train converted and displayed from the character train primitives on the CAD picture plane is being edited on the document picture plane, a CAD reflection processing module reflects the edition contents on the document picture plane to the character train primitives on the CAD picture plane.

20 Claims, 23 Drawing Sheets

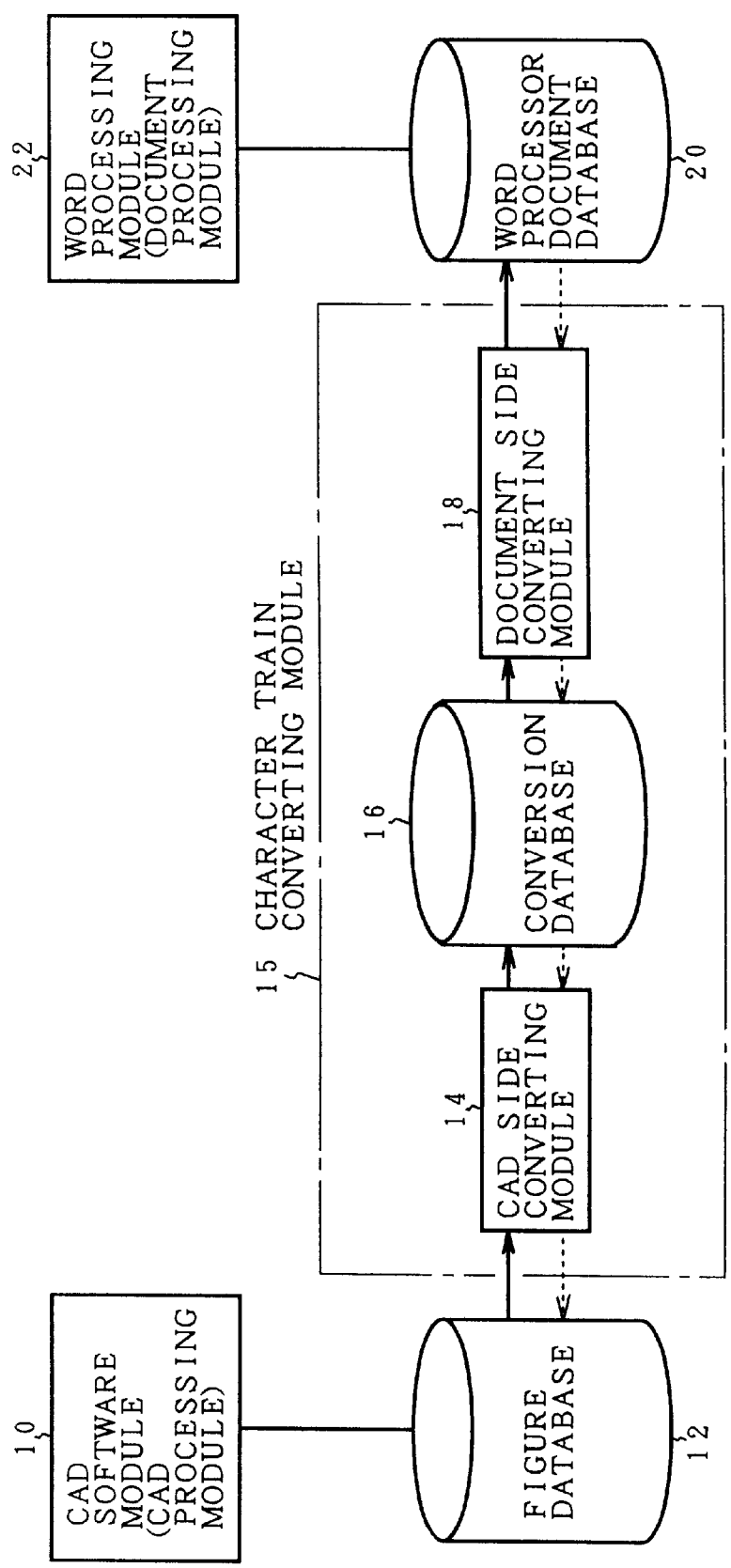

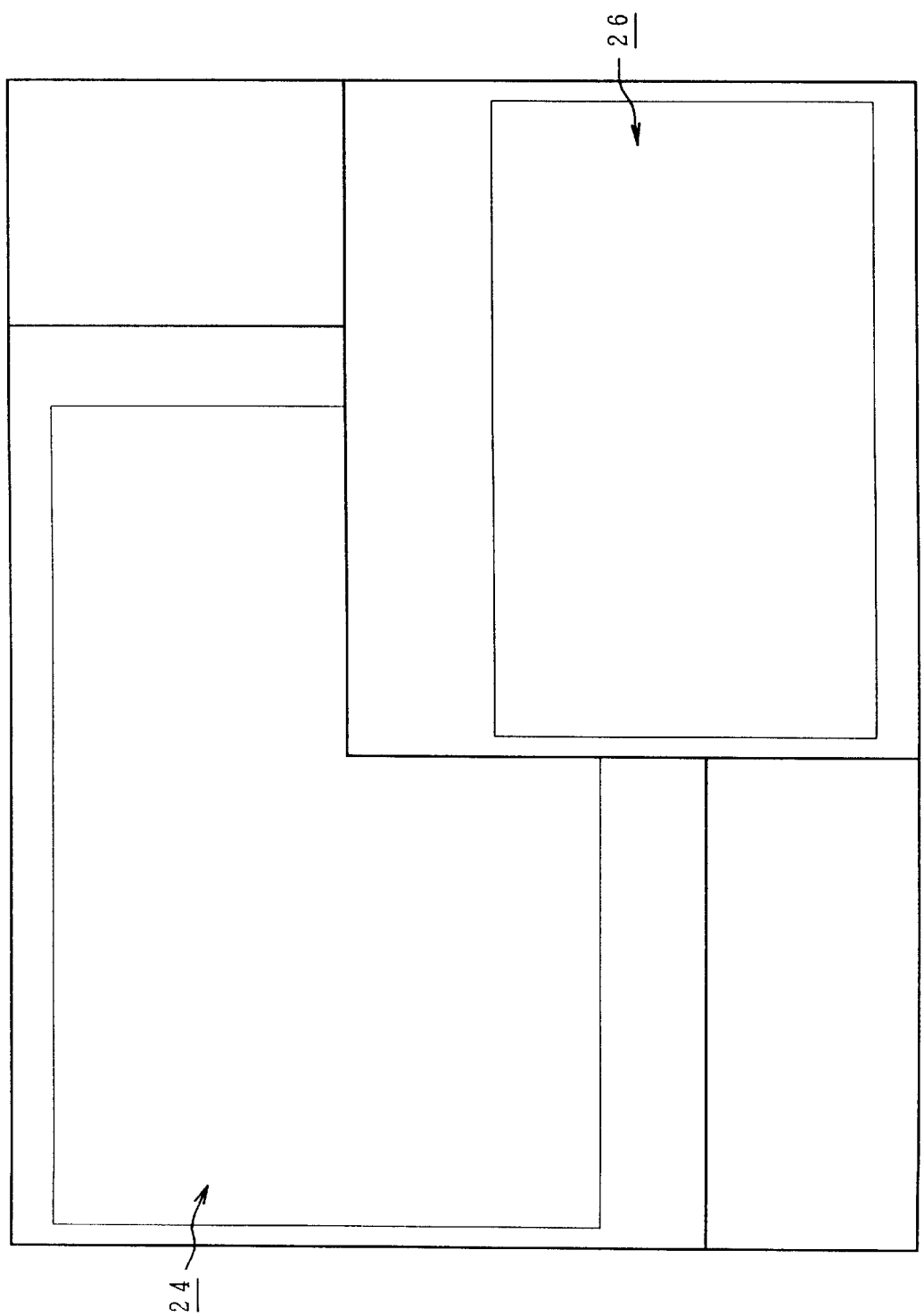

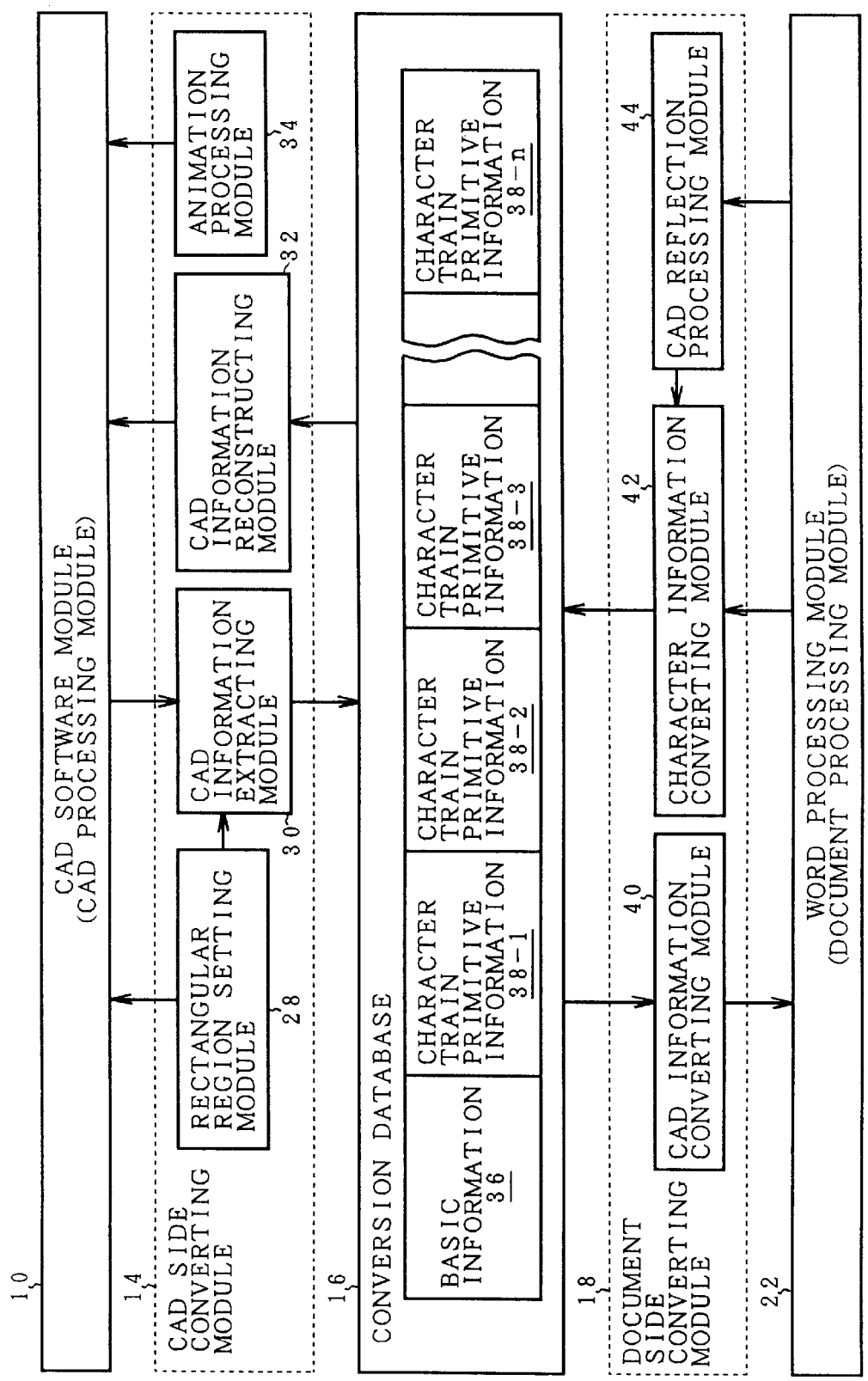

FIG. 4

| | ITEM | | SYMBOL | REMARKS |
|---|---|---|---|---|
| BASIC INFORMATION 36 | RECTANGLE ROTATION LAYOUT ANGLE | | θ | |
| | RECTANGLE LEFT UPPER COORDINATES | | X0, Y0 | |
| | RECTANGLE RIGHT LOWER COORDINATES | | X1, Y1 | |
| | REDUCTION CONVERSION COEFFICIENT | | DZ | |
| | CHARACTER TRAIN ROTATION REFERENCE POSITION | | SB | ANY ONE OF LEFT UPPER, LEFT CENTER, LEFT LOWER, UPPER CENTER, CENTER, LOWER CENTER, RIGHT UPPER, AND RIGHT LOWER |
| CHARACTER TRAIN PRIMITIVE INFORMATION 38 | NUMBER | | k | |
| | LAYOUT INFORMATION 84 | CHARACTER POSITION | Xs, Ys | X-COLUMN, Y-ROW |
| | | CHARACTER SIZE (pt) | Spt | THE NUMBER OF POINTS |
| | | CHARACTER THICKNESS | ST | ANY ONE OF KEYS OF BOLD LINE, MIDDLE LINE, AND THIN LINE |
| | | CHARACTER INTERVAL | Sbt | |
| | | LAYOUT ANGLE | r | CONCEALED CHARACTER |
| | | CHARACTER INCLINATION ANGLE | Ss | CONCEALED CHARACTER |
| | ATTRIBUTE INFORMATION 86 | DECORATION ATTRIBUTE | Sd | ANY ONE OF KEYS OF SURROUNDED CHARACTER, UNDERLINE, UPPERLINE, AND CORRECTION LINE |
| | | CHARACTER COLOR | Sc | |
| | | CHARACTER ENLARGEMENT /REDUCTION ATTRIBUTE | Sw | |
| | | SUFFIX ATTRIBUTE | Sun | SUPERSCRIPT, SUBSCRIPT |
| (CHARACTER TRAIN DATA) | CHARACTER TRAIN | | *Str | CHARACTER CODE |

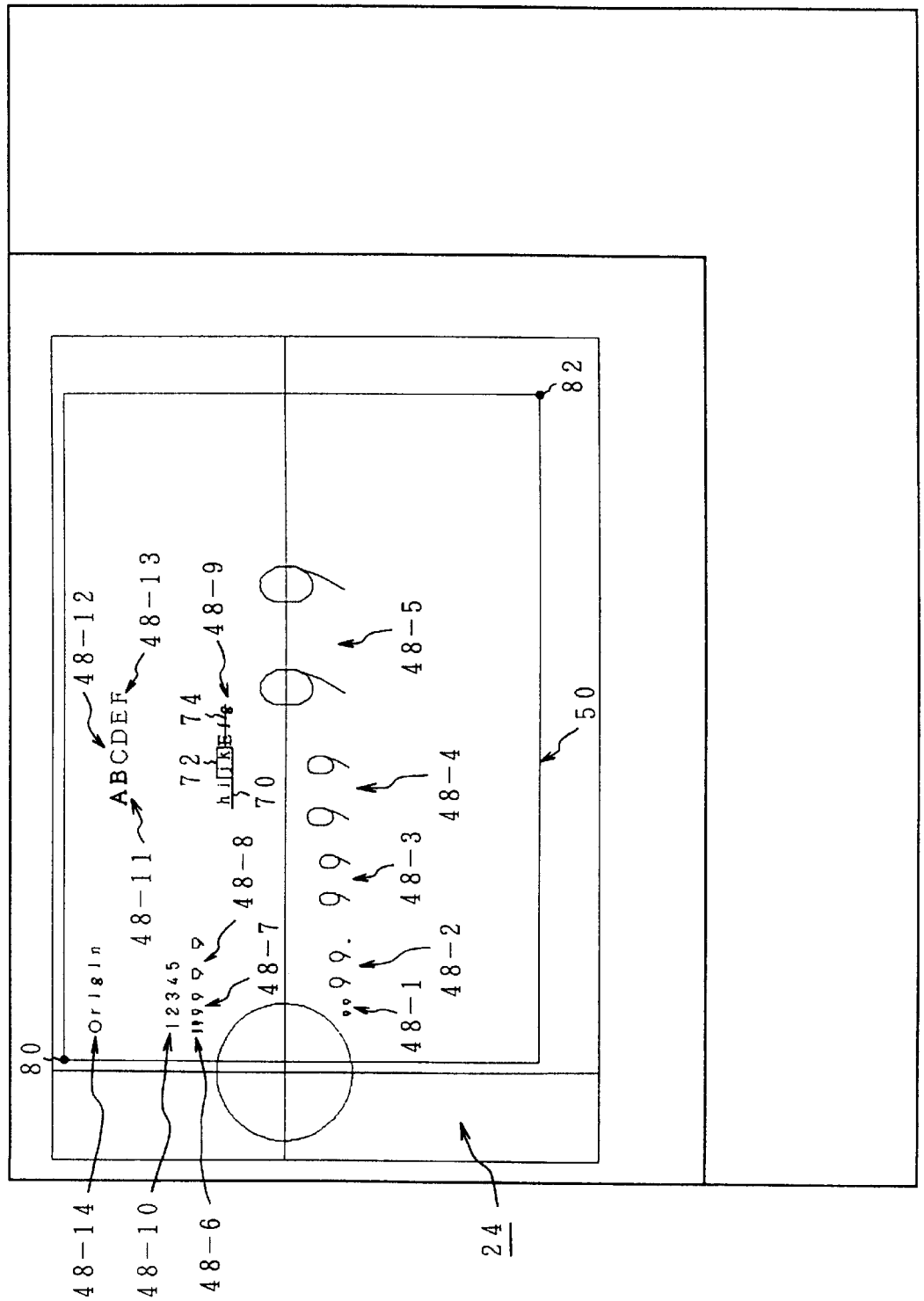

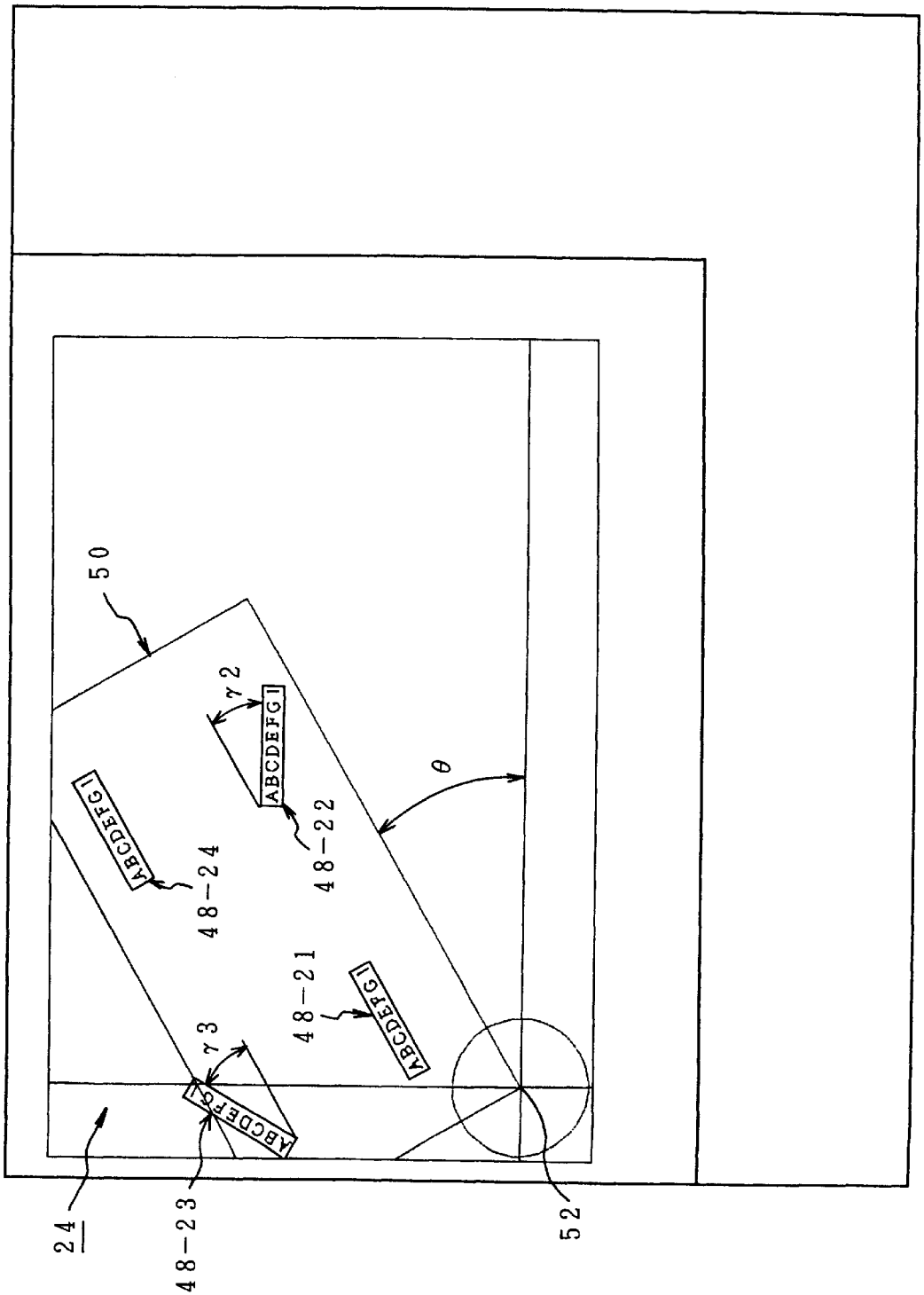

FIG. 7
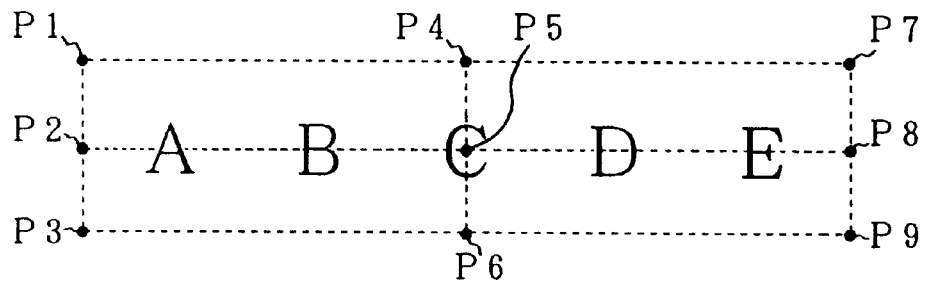
FIG. 8
| CAD | WORD PROCESSOR | |
| --- | --- | --- |
| | JAPANESE | ENGLISH |
| THIN LINE | MS MING-STYLE | COURIER |
| MIDDLE LINE | MS GOTHIC-STYLE | ELITE |
| BOLD LINE | MS GOTHIC BOLD | GOTHIC |
FIG. 9
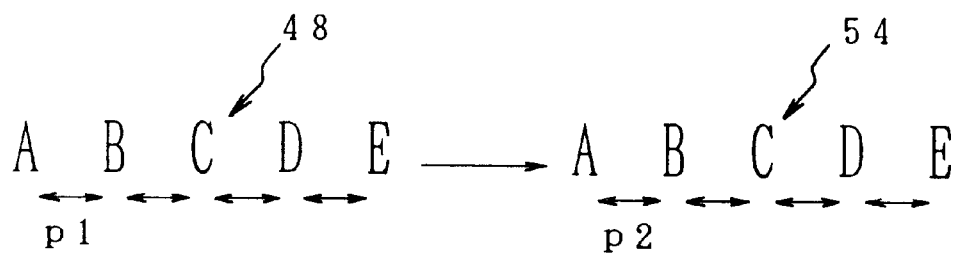
$p1 = p2$

| CAD | WORD PROCESSR |
|---|---|
| WHITE | AUTO |
| GREEN | GREEN |
| RED | RED |
| GRAY | SILVER |
| CYAN | PALE BULE |

W1/H1 = 0.8   W2/H2 = 0.8

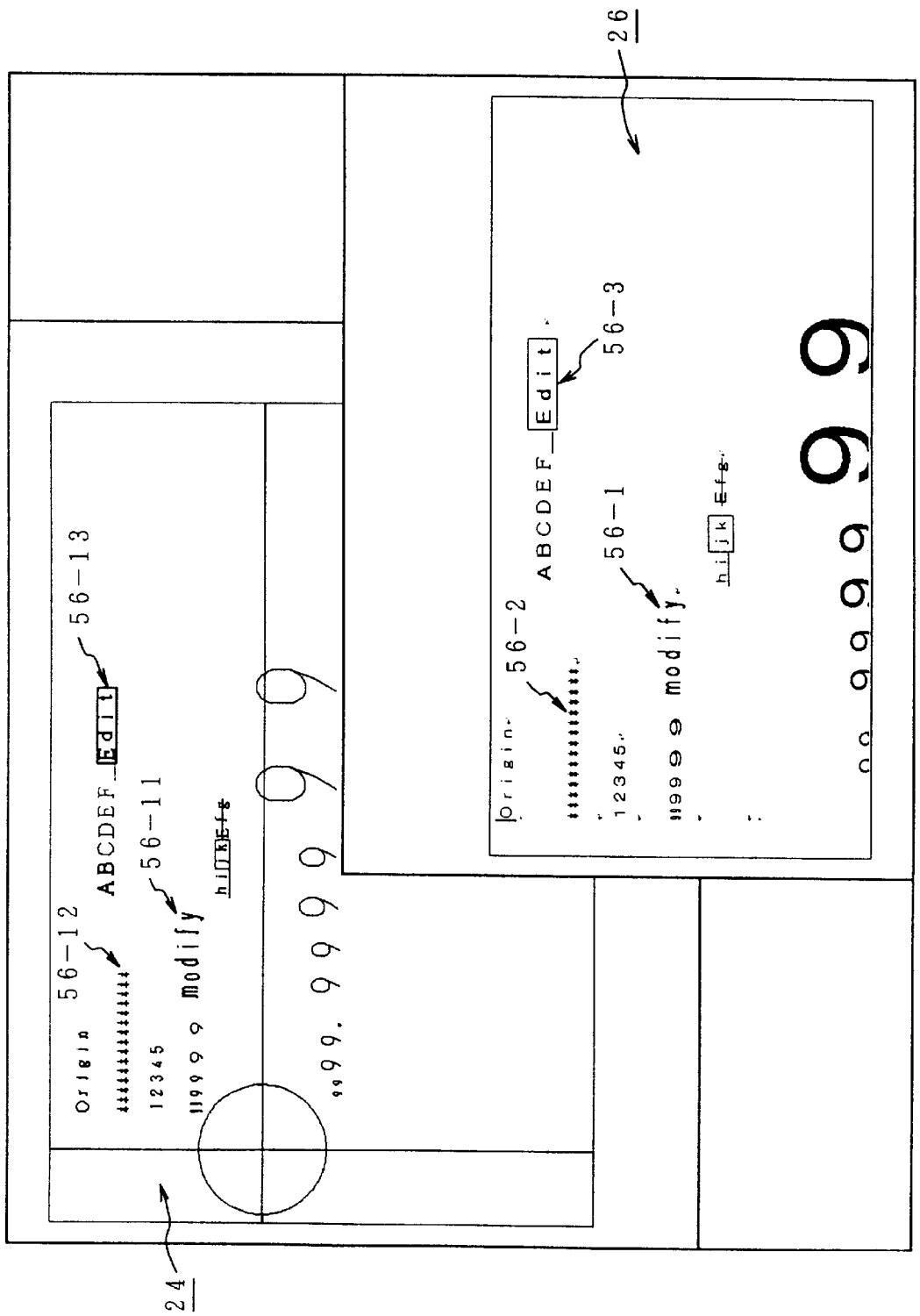

APPARATUS AND METHOD FOR EDITING CHARACTER TRAIN ON CAD PICTURE PLANE AND STORAGE MEDIUM STORING CAD CHARACTER TRAIN EDITING PROGRAM

BACKGROUND OF THE INVENTION

The present invention relates to a CAD character train editing apparatus and a method for inputting or editing a character train primitive of a diagram which is formed on a CAD picture plane by using a text editor or a word processor which is exclusively used for a document process and also relates to a storing medium in which a CAD character train editing program has been stored. More particularly, the present invention relates to CAD character train editing apparatus and method in which a plurality of character train primitives arranged on a CAD picture plane can be converted on a document picture plane and can be edited and also relates to a storing medium in which a CAD character train editing program has been stored.

In a character train input in a conventional CAD system, a character train is inputted by a character train input command provided in individual CAD software. It is, however, inferior and it is difficult to use as compared with a document process application for inputting and editing a character train of a text editor, a word processor, or the like which is widely spread at present. Therefore, a CAD system in which an application which is exclusively used for the document process of a text editor, a word processor, or the like is substituted for the input of the character train for a CAD picture plane has been published. In the CAD system, the character train can be inputted by the application which is exclusively used for the document process and reflected onto the CAD picture plane. The CAD system has a limitation such that the character train which can be inputted to the CAD picture plane is a single primitive and has a single attribute.

In a conventional CAD system, however, when a plurality of character train primitives are edited after the character train was inputted to the CAD picture plane by the application which is exclusively used for the document process, since the application which is exclusively used for the document process has to call every primitive, a vain operation of repetition occurs. Consequently, the character train cannot be inputted or edited by using the document picture plane for the plurality of character train primitives arranged on the CAD picture plane as targets. Thus, there are problems such that function of the application which is exclusively used for the document process cannot be effectively used and a work efficiency regarding the input and edition of the character train primitives is low.

SUMMARY OF THE INVENTION

According to the invention, there are provided an apparatus and a method for editing a character train on a CAD picture plane, in which a plurality of character train primitives existing on the CAD picture plane can be simultaneously inputted and edited on a document picture plane and the character train can be efficiently inputted and edited, and there is also provided a storing medium in which a CAD character train editing program has been stored.

A CAD character train editing apparatus of the invention comprises: a CAD processing module for inputting and arranging one or more character train primitives to an arbitrary position on a CAD picture plane at an arbitrary angle; a document processing module for operating in a same environment as that of the CAD processing module, inputting and displaying one or more character trains at an arbitrary position on a document picture plane in the lateral or vertical writing direction or both lateral and vertical writing directions, and editing the displayed character train on the document picture plane; and a character train converting module for converting the character train primitive on the CAD picture plane into the character train on the document picture plane and displaying and, contrarily, converting the character train on the document picture plane into the character train primitive on the CAD picture plane and displaying. The character train primitive denotes a basic shape of the character train as a target of the CAD editing process.

The CAD character train editing apparatus of the invention further has a CAD reflection processing module for reflecting edition contents on the document picture plane to the character train primitive on the CAD picture plane during the edition of the character train converted and displayed from the character train primitive on the CAD picture plane on the document picture plane. The reflection processing module can also automatically reflect the edition contents on the document picture plane to the CAD picture plane every preset time. The edition contents can be also reflected on the basis of a manual reflecting operation on the document picture plane.

The CAD side of the character train converting module has a rectangular region setting module, a CAD information extracting module, and a CAD information reconstructing module, and the document side has a CAD information converting module and a document information converting module. The rectangular region setting module on the CAD side sets an arbitrary rectangular region including the character train primitive as an edition target on the CAD picture plane. The CAD information extracting module extracts each of basic information including layout information of the rectangular region set on the CAD picture plane, CAD layout information of the character train primitive existing in the rectangular region, CAD character train attribute information which is used to express the character train primitive on the CAD picture plane, and character train primitive information including the character code train and stores the extracted information into a conversion database. The CAD information converting module on the document side converts the CAD layout information and CAD character train attribute information in the character train primitive information stored in the conversion database to document layout information and document character train attribute information on the document picture plane, and simultaneously, allows the character train corresponding to a character code train of the character train primitive stored in the conversion database to be displayed on the document picture plane by the document processing module. After the character train was inputted and edited, the document information converting module on the document side extracts the document layout information and character code train from the character train on the document picture plane and updates the CAD layout information and character code train of the character train primitive stored in the conversion database. Further, the document information converting module on the document side also extracts the document character train attribute information from the character train on the document picture plane and converts to the CAD character train attribute information and, after that, updates the CAD character train attribute information of the character train primitive stored in the conversion database. The CAD information reconstructing module on the CAD side reads out the basic information, CAD layout information, CAD character train attribute information, and character train primitive information including the character code train which have been stored in the conversion database, and allows the character train primitive corresponding to the character train edited by the document processing module to be displayed on the CAD picture plane. There are two modes of mode 1 and mode 2 of setting the rectangular region by the rectangular region setting module. In case of mode 1, the rectangular region setting module sets a rectangular region including the character train primitive on the CAD picture plane on the basis of a designation of rectangle left upper coordinates, rectangle right lower coordinates, and a rectangle layout angle θ. In case of mode 2, when a plurality of character train primitives as edition targets on the CAD picture plane are designated, the rectangular region setting module sets a circumscribed rectangular region including all of the designated character train primitives.

The rectangular region layout information included in the basic information extracted by the CAD information extracting module is the rectangle layout angle θ, rectangle left upper coordinates, and rectangle right lower coordinates which were set by the rectangular region setting module. Further, the basic information includes a reduction conversion coefficient which defines a conversion reduction between a character size on the CAD picture plane and a character size on the document picture plane and designation information of the rotational center point when the character train primitives arranged at the arbitrary angle on the CAD picture plane are converted to layout positions on the document picture plane by the rotation.

The CAD character train layout information that is extracted by the CAD information extracting module includes a character position, a character size, a character thickness, a character interval, a relative character train layout angle when the rectangular region is used as a reference, and a character inclination angle of the character train primitive. The CAD information converting module on the document side converts the character position, character size, character thickness, and character interval of the character train primitive in the CAD layout information into a character position, a character size, a character thickness, and a character interval of the corresponding character train on the document picture plane. The CAD information converting module converts the character train layout angle and character inclination angle into hidden characters which are added to the character code train and are not used for a display on the document picture plane. The document information converting module converts the character position, character size, and character thickness of the character train on the document picture plane into the character position, character size, and character thickness of the corresponding character train on the CAD picture plane. The document information converting module converts the hidden characters added to the character code of the character train to the character train layout angle and character inclination angle on the CAD picture plane. The CAD character train attribute information that is extracted by the CAD information extracting module includes a decoration attribute such as surrounded character, underline, overline, correction line, or the like, a character color, an enlargement/reduction attribute of an aspect ratio of the character, and a suffix attribute such as superscript, subscript, or the like. The CAD information converting module on the document side converts the decoration attribute, enlargement/reduction attribute, and suffix attribute included in the CAD character train attribute information into the decoration attribute, enlargement/reduction attribute, and suffix attribute of the corresponding character train on the document picture plane, respectively. The document information converting module converts the decoration attribute, enlargement/reduction attribute, and suffix attribute of the character train on the document picture plane into the decoration attribute, enlargement/reduction attribute, and suffix attribute of the corresponding character train on the CAD picture plane. A predetermined conversion table is used to convert the character train layout information and character train attribute information by the CAD information converting module and document information converting module.

The CAD side of the character train converting module further has an animation processing module. When the rectangular region including the character train primitive as a conversion target on the CAD picture plane is set by the rectangular region setting module and a converting process onto the document picture plane is started, the animation processing module allows a state in which the rectangular region having an arbitrary angle is rotated toward the layout format on the document picture plane and is converted on the CAD picture plane to be displayed by animation. That is, the animation processing module obtains the number (n) of images derived by dividing the layout angle θ of the rectangular region set on the CAD picture plane by an angle φ of rotation of a predetermined animation display, forms an auxiliary diagram indicative of the rectangular region every angle φ of rotation, and displays a stepwise change in the rotating position. Synchronously with the display of the auxiliary diagram of the rectangular region, an auxiliary diagram of a rectangular frame surrounding the character train primitive is formed every stepwise rotation obtained by dividing a layout angle γ of the character train primitive by the number (n) of images and is displayed step by step.

According to such a CAD character train editing apparatus of the invention, a plurality of character train primitives existing on the CAD picture plane are simultaneously designated and the application which is exclusively used for the document process such as word processor or text editor can be allowed to substitute for input and edition of the character train primitives on the document picture plane, so that the work efficiency of the input and edition of the character train can be remarkably improved. In this case, the decoration, attribute setting, and change of the character train primitive which can be conventionally performed only on the CAD picture plane can be also executed by the input and edition on the document picture plane. Further, the invention can also properly cope with a case in which the character train primitive has an oblique layout angle on the CAD picture plane which cannot be expressed on the document picture plane. By reflecting the edition contents to the character train primitive on the CAD picture plane in a real-time manner or by an operation of the user during the edition in which the character train primitive of the CAD picture plane is converted and displayed on the document picture plane, the contents of the editing work on the document picture plane having a different character train layout state are promptly reflected to the character train primitive on the CAD picture plane. Consequently, the result of the input and edition can be easily grasped. The inputting and editing works of the character train can be efficiently executed with an operation feeling equivalent to the operation as if the character train primitive was directly inputted and edited on the CAD picture plane. Further, when the character train primitive on the CAD picture plane is converted and displayed on the document picture plane, a state in which the auxiliary diagram showing the rectangular frame and the character train frame in the rectangular frame on the CAD picture plane are rotated and moved to the layout format on the document picture plane step by step is shown as an animation. The user, therefore, can easily understand the correspondence between the CAD picture plane and the document picture plane having different layout states and can easily execute the inputting and editing works of the character train on the document picture plane. Thus, a work burden on the user for inputting and arranging the character train primitives on the CAD picture plane can be remarkably reduced and the invention can contribute to improve the working efficiency of the user.

The invention also provides a CAD character train editing method comprising: a CAD processing step of inputting and arranging one or more character train primitives with an arbitrary angle at arbitrary positions on a CAD picture plane; a document processing step of operating in the same environment as that of the CAD process, inputting and displaying one or more character trains at arbitrary positions on a document picture plane in a lateral writing or vertical writing direction or both lateral and vertical writing directions, and editing the displayed character trains on the document picture plane; and a character train converting step of converting the character train primitive on the CAD picture plane to the character train on the document picture plane and displaying and, contrarily, converting the character train on the document picture plane to the character train primitive on the CAD picture plane and displaying.

The details of the CAD character train editing method are fundamentally the same as the apparatus construction.

Further, the invention provides a storing medium in which a CAD character train editing program has been stored. The storing medium in which the CAD character train editing program has been stored has: a CAD processing module for inputting and arranging one or more character train primitives at an arbitrary angle at arbitrary positions on a CAD picture plane; a document processing module for operating in the same environment as that of the CAD processing module, inputting and displaying one or more character trains at arbitrary positions on the document picture plane in the lateral or vertical writing direction or both lateral and vertical writing directions, and editing the displayed character trains on the document picture plane; and a character train converting module for converting the character train primitive on the CAD picture plane to the character train on the document picture plane and displaying and, contrarily, converting the character train on the document picture plane to the character train primitive on the CAD picture plane and displaying. The details of the storing medium in which the CAD character train editing program has been stored are fundamentally the same as the apparatus construction.

The above and other objects, features, and advantages of the present invention will become more apparent from the following detailed description with reference to the drawings.

BRIEF DESCRIPTION OF THE DRAWINGS

FIG. 1 is an explanatory diagram of an operation environment of the invention;

FIG. 2 is an explanatory diagram of a CAD picture plane and a document picture plane which are used in the invention;

FIG. 3 is a functional block diagram of a character train editing process according to the invention;

FIG. 4 is an explanatory diagram of storage information of a conversion database which is used for a character train conversion of the CAD picture plane;

FIG. 5 is an explanatory diagram of a character train primitive and a rectangular region of the CAD picture plane;

FIG. 6 is an another explanatory diagram of a character train primitive and a rectangular region of the CAD picture plane;

FIG. 7 is an explanatory diagram of a rotational center position which can be set to a character train;

FIG. 8 is an explanatory diagram of a conversion table which is used for a conversion of a character thickness;

FIG. 9 is an explanatory diagram of converting characteristics of a character interval;

FIG. 26 is an explanatory diagram of a CAD picture plane and document picture plane according to a real-time reflecting process in FIG. 25.

DETAILED DESCRIPTION OF THE PREFERRED EMBODIMENT

[Operation environment and function]

Figures 10, 11:
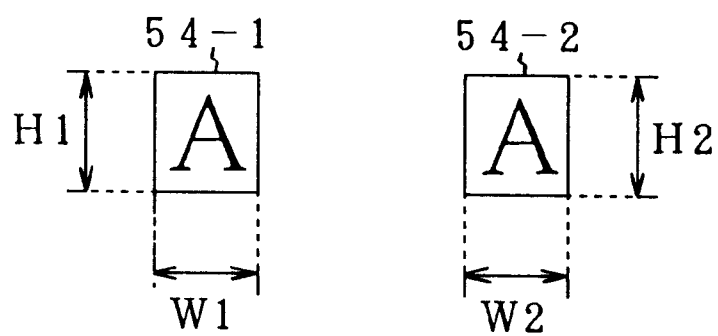
FIG. 10 is an explanatory diagram of a conversion table which is used for a conversion of a character color.
FIG. 11 is an explanatory diagram of converting characteristics of a character enlargement/reduction attribute.

FIG. 1 shows an operation environment of a computer apparatus to which a CAD character train converting process of the invention is applied. In the CAD character train converting process of the invention, a CAD software module 10 and a word processing module 22 can be simultaneously operated in one computer environment. The CAD character train converting process lies in a computer environment in which the CAD software module 10 and word processing module 22 can be arbitrarily switched by the operation of the user.

FIG. 2 shows a CAD picture plane 24 and a document picture plane 26 on a display which are used in the computer environment in which the CAD software module 10 and word processing module 22 in FIG. 1 can be simultaneously operated. A CAD process using the CAD picture plane 24 and a document forming process by a document input and an edition using the document picture plane 26 can be realized in the same computer environment by a switching operation of the user. A character train primitive can be inputted and arranged with an arbitrary angle at an arbitrary position on the CAD picture plane 24. In the document picture plane 26, on the other hand, one or more character trains are inputted and displayed at arbitrary positions in the lateral writing direction, vertical writing direction, or both of the lateral and vertical writing directions, but a character train in the oblique direction having an arbitrary angle like a CAD picture plane cannot be arranged.

Referring again to FIG. 1, with respect to the computer environment in which the CAD software module 10 and word processing module 22 can be simultaneously operated as mentioned above, in the invention, a character train converting module 15 is provided between a figure database 12 of the CAD software module 10 and a document database 20 of the word processing module 22. The character train converting module 15 is constructed by a CAD side converting module 14, a conversion database 16, and a document side converting module 18. The CAD side converting module 14 extracts information to display the character train in the document picture plane from a character train primitive in a region as a conversion target on the CAD picture plane which has been stored in the figure database 12 and stores the extracted information into the conversion database 16. The character train conversion information stored into the conversion database 16 is converted into document character train information which can be displayed in the document picture plane by the document side converting module 18 and is stored into the document database 20 and, after that, the character train is displayed in the document picture plane by a process of the word processing module 22. The document character train after completion of an editing process by the word processing module 22 is stored into the document database 20 and, after that, it is inversely converted by the document side converting module 18 and is stored into the conversion database 16. Further, the character train is inversely converted by the CAD side converting module 14 and is returned to the figure database 12. A result of the inverse conversion of the returned character train is displayed as a character train primitive after completion of the edition onto the CAD picture plane by the CAD software module 10.

FIG. 3 shows the details of a processing function of the character train converting module 15 in FIG. 1. First, in the CAD side converting module 14 provided on the CAD software module 10 side, a rectangular region setting module 28, a CAD information extracting module 30, a CAD information reconstructing module 32, and further, an animation processing module 34 are provided. Basic information 36 formed by the CAD information extracting module 30 and character train primitive information 38-1 to 38-n of the respective character train primitives are stored in the conversion database 16 every rectangular region as a conversion target of the character train primitive of the CAD picture plane set by the CAD side converting module 14. A CAD information converting module 40, a character information converting module 42, and further, a CAD reflection processing module 44 are provided for the document side converting module 18 locating between the word processing module 22 and conversion database 16. An outline of the processing function in FIG. 3 is as follows. First, a rectangular region as a conversion target is set by the rectangular region setting module 28 for a plurality of character primitives on the CAD picture plane formed by the CAD software module 10. As a method of setting the rectangular region by the rectangular region setting module 28, there are the following two methods.

Mode 1: A rectangular region is set on the CAD picture plane by clicking a mouse.

Mode 2: When the character train primitive is designated on the CAD picture plane by clicking the mouse, a circumscribed rectangular region including all of the designated character train primitives is set.

When the rectangular region is set to the CAD picture plane, the CAD information extracting module 30 extracts the basic information 36 of the rectangular region and the character train primitive information 38-1 to 38-n of the respective character train primitives included in the rectangular region and stores the extracted information into the conversion database 16. The basic information 36 is information regarding a layout of the rectangular region set on the CAD picture plane. The character train primitive information 38-1 to 38-n includes layout information, attribute information, and character code trains of the character train primitives as conversion targets. Now assuming that the basic information 36 and character train primitive information 38-1 to 38-n were stored into the conversion database 16, the CAD information converting module 40 of the document side converting module 18 converts the character train primitive information 38-1 to 38-n, as targets, excluding the basic information 36 into the character train document information which can be displayed on the word processing module 22 side, provides the converted information to the word processing module 22, and displays the character trains converted form the CAD picture plane onto the document picture plane. The character trains displayed on the document picture plane are processed by the input function and editing function of the word processing module 22. When the editing process is finished, the character information converting module 42 extracts the character train of the edited document picture plane, converts into the character train primitive information which can be expressed on the CAD software module 10 side, and rewrites and updates the corresponding character train primitive information 38-1 to 38-n stored in the conversion database 16 at this time. After completion of the updating of the character train primitive information 38-1 to 38-n in the conversion database 16, the CAD information reconstructing module 32 of the CAD side converting module 14 reads out the updated character train primitive information 38-1 to 38-n in the conversion database 16 and the basic information 36 which has already been held, deletes the corresponding character train primitive in the CAD picture plane by the CAD software module 10, and displays the edited character train primitive on the word processing module 22 side. The animation processing module 34 provided for the CAD side converting module 14 processes the conversion to a layout form of the document picture plane of the word processing module 22 when the rectangular region is set into the CAD picture plane as an animation on the picture plane. Further, the CAD reflection processing module 44 provided for the document side converting module 18 executes a process to reflect the character train during the edition into the CAD picture plane during the edition of the character train converted from the CAD picture plane by the word processing module 22. As a reflecting process by the CAD reflection processing module 44, there are a real-time reflecting process which is executed in a real-time manner at every predetermined time by using a timer and a manual reflecting process which is reflected by the operation of the user in the document picture plane. In this instance, in the actual apparatus, the character train conversion data to be stored in the conversion database 16 provided between the CAD side converting module 14 and document side converting module 18 is converted into an intermediate language of a script form which can be accepted by the word processing module 22 and is stored. Therefore, the actual CAD information extracting module 30 provided for the CAD side conversion processing module 14 converts a description language on the CAD software module 10 side into the intermediate language which can be accepted on the word processing module 22 side and stores as basic information 36 and character train primitive information 38-1 to 38-n into the database 16. In the CAD information reconstructing module 32 of the CAD side converting module 14, the basic information 36 described by the intermediate language on the word processing module 22 side of the conversion database 16 and the character train primitive information 38-1 to 38-2n of each character train are converted into the description language of the CAD software module 10 and displayed on the CAD picture plane. Further, in the CAD information converting module 40 on the document converting module 18 side, the intermediate language of the conversion database 16 is converted to a description language which can be expressed by the word processing module 22 and is displayed on the document picture plane. Further, the document information converting module 42 converts the description language of the character train in the document picture plane by the word processing module 22 into the intermediate language and rewrites and updates the corresponding character train primitive information in the conversion database 16.

[Formation of conversion data base]

FIG. 4 shows the character train conversion information which is extracted by the CAD information extracting module 30 provided for the CAD side converting module 14 in FIG. 3 and is stored into the conversion database 16. The character train conversion information is constructed by the basic information 36 and character train primitive information 38. The basic information 36 is set in correspondence to the rectangular region set in the CAD picture plane by the rectangular region setting module 28. The basic information 36 includes a rectangle rotation layout angle θ, rectangle left upper coordinates (X0, Y0), rectangle right lower coordinates (X1, Y1), a reduction conversion coefficient DZ, and a character train rotation reference position SB as layout information regarding the rectangular region.

FIG. 5 shows an example of the CAD picture plane 24 as a target of the character train converting process. As primitives other than the figure primitives of a circle, a straight line, or the like, in the example, character train primitives 48-1 to 48-13 are inputted and arranged on the CAD picture plane 24. A character train inputted by a character train input command provided for the CAD software module 10 is displayed. The character primitives 48-1 to 48-5 are the character train primitives of different character sizes with respect to two characters "99". The character primitives 48-6 to 48-8 are the character train primitives in which with respect to two characters "99", although heights of characters are equal, lateral widths of characters are different, namely, the character primitives in which aspect ratios of the characters are different. Each of the character primitives 48-9, 48-10, and 48-14 is one character train primitive. Further, the character train primitives 48-11 and 48-13 are the character primitives of every two characters in which thicknesses of characters are different although character sizes are equal. Namely, "AB" are bold characters, "CD" are middle characters, and "EF" are thin characters. A rectangular region 50 is set in order to convert the character train primitives 48-1 to 48-6 arranged on the CAD picture plane 24 into the document picture plane 26 in FIG. 2 and to display them. With respect to the rectangular region 50, the basic information 36 in FIG. 4 is formed. The rectangle rotation layout angle θ in the basic information 36 is an inclination angle for the horizontal direction of the rectangular region 50. In this case, the rectangular region 50 relates to a case of θ=0°.

FIG. 6 shows another example of the CAD picture plane 24. Four character train primitives 48-11 to 48-14 are arranged on the CAD picture plane 24 and the rectangular region 50 is set. In this case, the rectangular region 50 has an inclination of the angle θ for the horizontal direction and is set to the rectangle rotation layout angle θ in the basic information 36 in FIG. 4. The rectangle left upper coordinates (X0, Y0) and rectangle right lower coordinates (X1, Y1) are points to be clicked by using the mouse when the rectangular region 50 is set onto the CAD picture plane 24 in FIGS. 5 and 6. When the rectangular region setting mode 1 is explained as an example, since the rectangle rotation layout angle θ=0° in this case on the CAD picture plane 24 in FIG. 5, the cursor is set to rectangle left upper coordinates 80 and the mouse is clicked. Subsequently, the point is moved to right lower coordinate position 82 while dragging and turning off the clicking operation, so that the rectangular region 50 can be set.

When the oblique rectangular region 50 is set as shown in FIG. 6, for instance, the following operations are executed.

I. Two points P1 and P2 are hit by the mouse. A line connecting the points P1 and P2 which were hit is displayed as one side of a rectangle.

II. When a point P3 is hit by the mouse to the position serving as an opposite side of the rectangle for one side of P1-P2, an opposite side passing the point P3 is set and displayed. Finally, a rectangular region is set and displayed.

In case of further rotating the set rectangular region, for example, the center 52 of rotation is set by moving the cursor to the left lower corner and clicking the mouse and, in this state, by opening the set window of the rectangle rotation layout angle θ and performing the setting operation, the rectangular region 50 can be rotated to an arbitrary layout angle on the picture plane around the rotational center 52 as a center. In the rectangular region setting mode 2, on the CAD picture planes of FIGS. 5 and 6, by designating the character train primitives as edition targets by clicking the mouse, a circumscribed rectangular region including all of the designated character train primitives is set. Even in this case, the rotational center is set with respect to the set rectangular region, a set widow of the rectangle rotation layout angle θ is opened in this state, and the setting operation is performed, so that the rectangular region can be rotated to the set layout angle.

The reduction conversion coefficient DZ of the basic information 36 in FIG. 4 defines a reduction relation between the character size on the CAD picture plane 24 and the character size on the document picture plane 26. Specifically speaking, since the character size on the CAD picture plane is expressed by a millimeter unit and the character size on the document picture plane is expressed by the point number, such a relation is previously defined. Further, the character train rotation reference position SB of the basic information 36 is set to the center position for rotating and converting the character train primitives 48-11 to 48-14 existing in the rectangular region 50 of the CAD picture plane 24 in FIG. 6 into the character train according to the document picture plane in which the character train can be arranged in only the horizontal direction of the picture plane. Specifically speaking, as shown in FIG. 7, in case of a character train "ABCDE" as an example, with respect to a rectangular region surrounding this character train, any one of the points P1 (left upper), P2 (left middle), P3 (left lower), P4 (middle upper), P5 (middle middle), P6 (middle lower), P7 (right upper), P8 (right middle), and P9 (right lower) can be set by a key operation. Character train primitive information 38 set subsequent to the basic information 36 is formed every character train primitive included in the rectangular region 50 set on the CAD picture plane 24. The character train primitive information 38 is divided into layout information 84 and attribute information 86. The layout information 84 includes a character position (Xs, Ys), a character size Spt, a character thickness ST, a character interval Sbt, a layout angle $\gamma$, and a character inclination angle Ss. The character position (Xs, Ys) is defined by X-column indicative of the character position in the horizontal direction and a Y-row indicative of the upper position in the vertical direction. The character size can be obtained as a point number on the document from the millimeter size on the CAD from the reduction conversion coefficient DZ of the basic information 36. For example, the size of 4 mm on the CAD picture plane corresponds to 12-point on the document picture plane. The size of 8 mm on the CAD picture plane corresponds to 24-point on the document picture plane. The character thickness ST is designated by any one of selection keys of a bold line, a middle line, and a thin line. A conversion relation between the CAD side and the word processor side can be converted by using a conversion table as shown in FIG. 8. As for the character interval Sbt, as shown in FIG. 9, the pitch interval of millimeters of a CAD character train primitive 48 is converted into a pitch interval P2 corresponding to the font size in accordance with the reduction conversion coefficient DZ of the basic information 36 in a manner similar to the case of the character size Spt. The character interval Sbt can be also included in the attribute information 86 instead of the layout information 84. The layout angle $\gamma$ is set to, for example, angles $\gamma 2$ and $\gamma 3$ indicative of character train primitives 48-22 and 48-23 in the rectangular region 50 in the CAD picture plane 24 in FIG. 6. In character train primitives 48-21 and 48-24, since they are parallel with the line of the lower side in which the layout angle of the character train is equal to the rotation layout angle $\theta$ of the rectangular region 50, their layout angles $\gamma 1$ and $\gamma 4$ are set to 0°, respectively. Further, the character inclination angle Ss in the layout information 84 shows an inclination of each character for the horizontal axis in the character layout direction in the character train primitives 48-1 to 48-14 and 48-21 to 48-24 in FIGS. 5 and 6, respectively. Although the layout angle $\gamma$ and character inclination angle Ss in the layout information 84 are the parameters which can be expressed on the CAD picture plane 24 by the CAD software module 10, they cannot be expressed on the document picture plane 26 by the word processing module 22. Therefore, with respect to two parameters of the layout angle $\gamma$ and character inclination angle Ss, when converting into the document character train information of the word processing module 22, they are added as hidden characters at the last position of a character train *Str shown in the bottom in FIG. 4.

The attribute information 86 of the character train primitive information 38 will now be described. First, a decoration attribute Sd is any one of a surrounded character, an underline, an upperline, and a correction line and can be set by the corresponding key operation. For example, when seeing the CAD picture plane 24 in FIG. 5, an underline 70, a surrounding line 72, and a correction line 74 are added to the character train primitive 48-3. The decoration attribute Sd is an attribute which can be expressed in a one-to-one corresponding manner in any of the CAD picture plane 24 and document picture plane 26. As for a next character color Sc, colors to be expressed in the CAD picture plane 24 and document picture plane 26 are generally different. Therefore, as for the conversion of the character color Sc, a color conversion table as shown in FIG. 10 is used.

In a character enlargement/reduction attribute Sw, the relation of the aspect ratios between a character 54-1 on the CAD picture plane and a character 54-2 on the document picture plane is defined as shown in FIG. 11. That is, in the CAD character 54-1, although a height H1 and a lateral width W1 are displayed by millimeters, the character enlargement/reduction attribute Sw in FIG. 4 is set as a ratio (W1/H1=0.8) between them. Therefore, in case of the document character 54-2 corresponding to the CAD character 54-1, although the aspect ratio is determined by the setting of the point number of the character size, with regard to this relation, an aspect ratio (W2/H2) between a height H2 and a lateral width W2 is converted so as to set the character enlargement/reduction attribute to Sw=0.8 in a rule similar to the CAD character 54-1. Further, a suffix attribute Sun of the attribute information 86 in FIG. 4 has a superscript and a subscript. The suffix attributes Sun of the CAD picture plane and the document picture plane correspond in a one-to-one relation and have a compatibility. The character train *Str is stored in the last of the character train primitive information 38 and is a set of character codes. The character code train indicative of the character train *Str doesn't particularly need to be converted and is supplied as it is.

[Converting process of character train]

Figure 12:
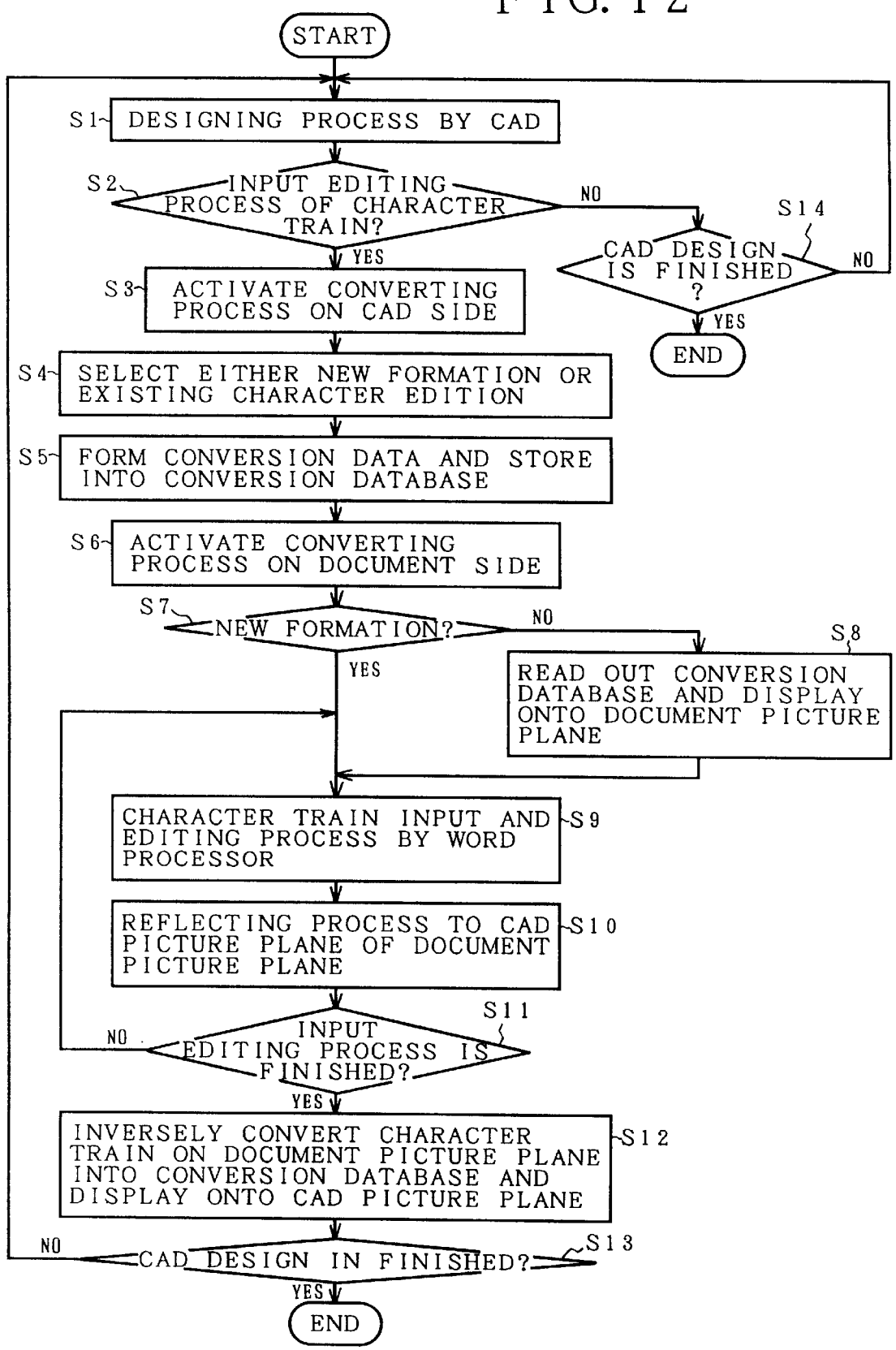
FIG. 12 is a generic flowchart for a character train editing process of the invention.

FIG. 12 is a generic flowchart for a character train converting process of the invention in the functional block of FIG. 3. First in step S1, the CAD software module 10 is activated and a designing process such as a figure formation on the CAD picture plane or the like is carried out. During the designing process, the presence or absence of an input editing process of a character train is discriminated in step S2. When it is determined that an operation to request the input editing process of a character train has been performed, step S3 follows and a converting process of the CAD side converting module 14 is activated. In step S4, either one of a mode to newly form characters and a mode to edit the existing characters is selected. When the new formation is selected, for example, since no character train primitive exists on the CAD picture plane 24 in FIG. 5, only the rectangular region 50 in which the character train primitives are arranged is set by the rectangular region setting module 28. On the other hand, in case of the existing character edition, as shown in FIG. 5, the rectangular region 50 is set by the rectangular region setting module 28 so as to surround the character train primitives 48-1 to 48-6 as editing targets on the CAD picture plane 24. In case of the new formation, step S9 follows, the word processing module 22 is activated and the input editing process on the document picture plane is executed. In case of the editing process, step S8 follows and the character train based on the conversion database 16 is converted and displayed on the document picture plane. Subsequently, the character input and editing process by the activation of the word processing module in step S9 are executed. During the character input and editing process in step S9, a reflecting process to the picture plane display between the word processing module 22 and CAD software module 10 is executed in step S10. Namely, a process for reflecting the character train on the CAD picture plane during the edition to the character train primitive on the CAD picture plane is performed. In step S11, when it is determined that the input editing process by the word processing module 22 has been finished, in step S12, the character train of the document picture plane is inversely converted into the conversion database 16 and, after that, it is displayed on the CAD picture plane. That is, in the document information converting module 42, the layout information and attribute information are extracted from the character train in the document picture plane and converted into the layout information 84 and attribute information 86 which can be expressed on the CAD picture plane in FIG. 4, the character train primitive information 38 is formed, and the corresponding character train primitive information before edition which has already been stored in the conversion database 16 is rewritten and updated by the character train primitive information 38 formed. After completion of the rewriting and updating, the character train primitive information 38 which has already been rewritten and updated is read out together with the corresponding basic information 36 from the conversion database 16 by the CAD information reconstructing module 32 and supplied to the CAD software module 10, thereby displaying the edited character train primitives onto the CAD picture plane. In step S3, a check is made to see if the CAD design has been finished or not. If NO, the processing routine is returned to step S1 and similar processes are repeated until the end of CAD design is discriminated in step S14.

Figure 13:
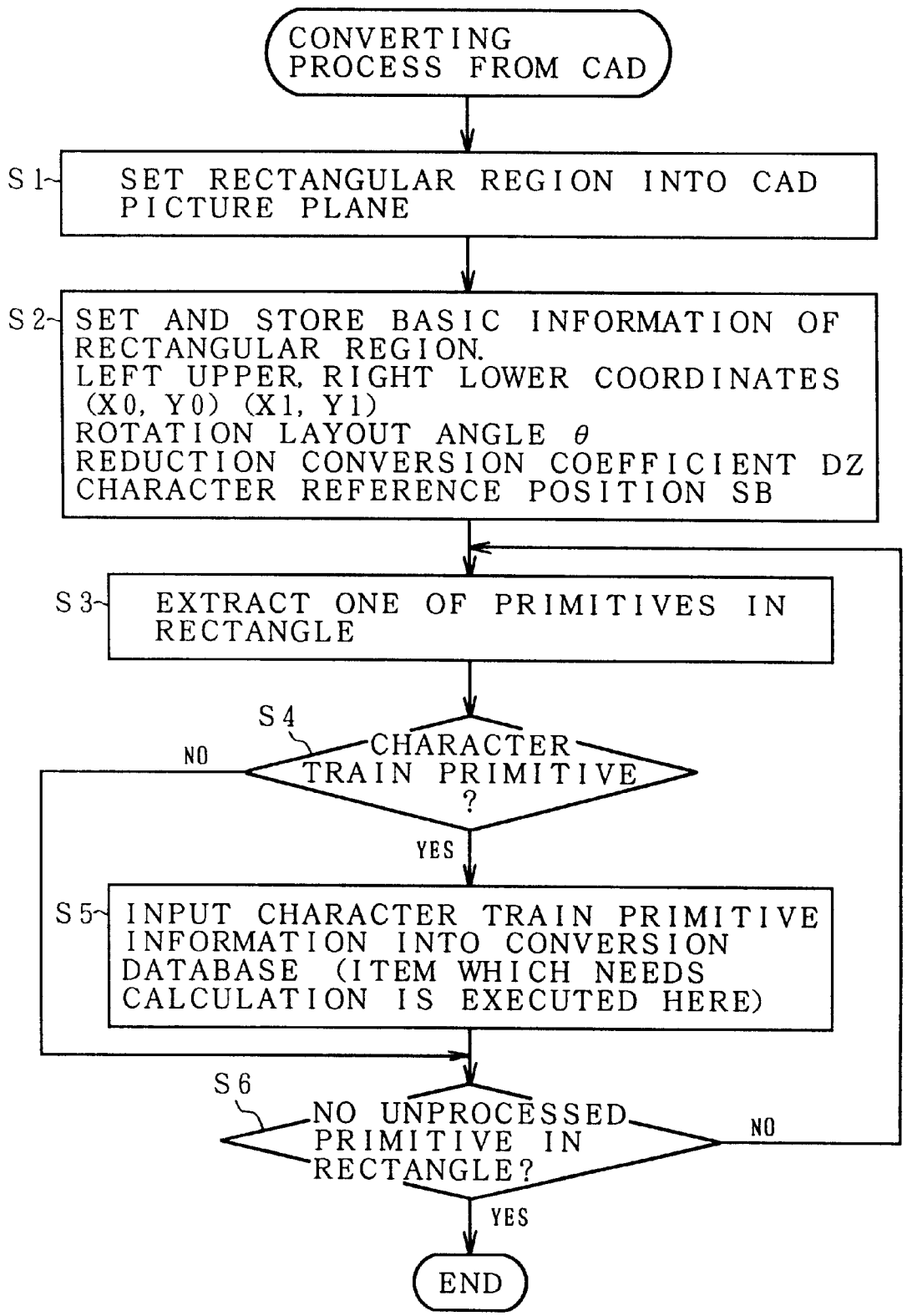
FIG. 13 is a flowchart for a converting process from a CAD picture plane to a conversion database.

FIG. 13 is a detailed flowchart for a converting process from the CAD picture plane to the conversion database 16. First in step S1, a rectangular region as a character train conversion target is set onto the CAD picture plane by the rectangular region setting module 28. In step S2, the rectangle rotation layout angle θ, rectangle left upper coordinates (X0, Y0), rectangle right lower coordinates (X1, Y1), reduction conversion coefficient DZ, and character train rotation reference position SB are set as basic information 36 in FIG. 4 regarding the set rectangular region. In step S3, the primitives are extracted one by one from the set rectangular region. In step S4, when it is determined to be the character train primitive, step S5 follows. It is converted into the character train primitive information 38 shown in FIG. 4 and is stored into the conversion database 16. In this case, with regard to the information items which need an arithmetic operation, the arithmetic operating process is executed here. The above processes in steps S3 to S5 are repeated until there is no unprocessed primitive in the rectangular region in step S6.

Figure 14:
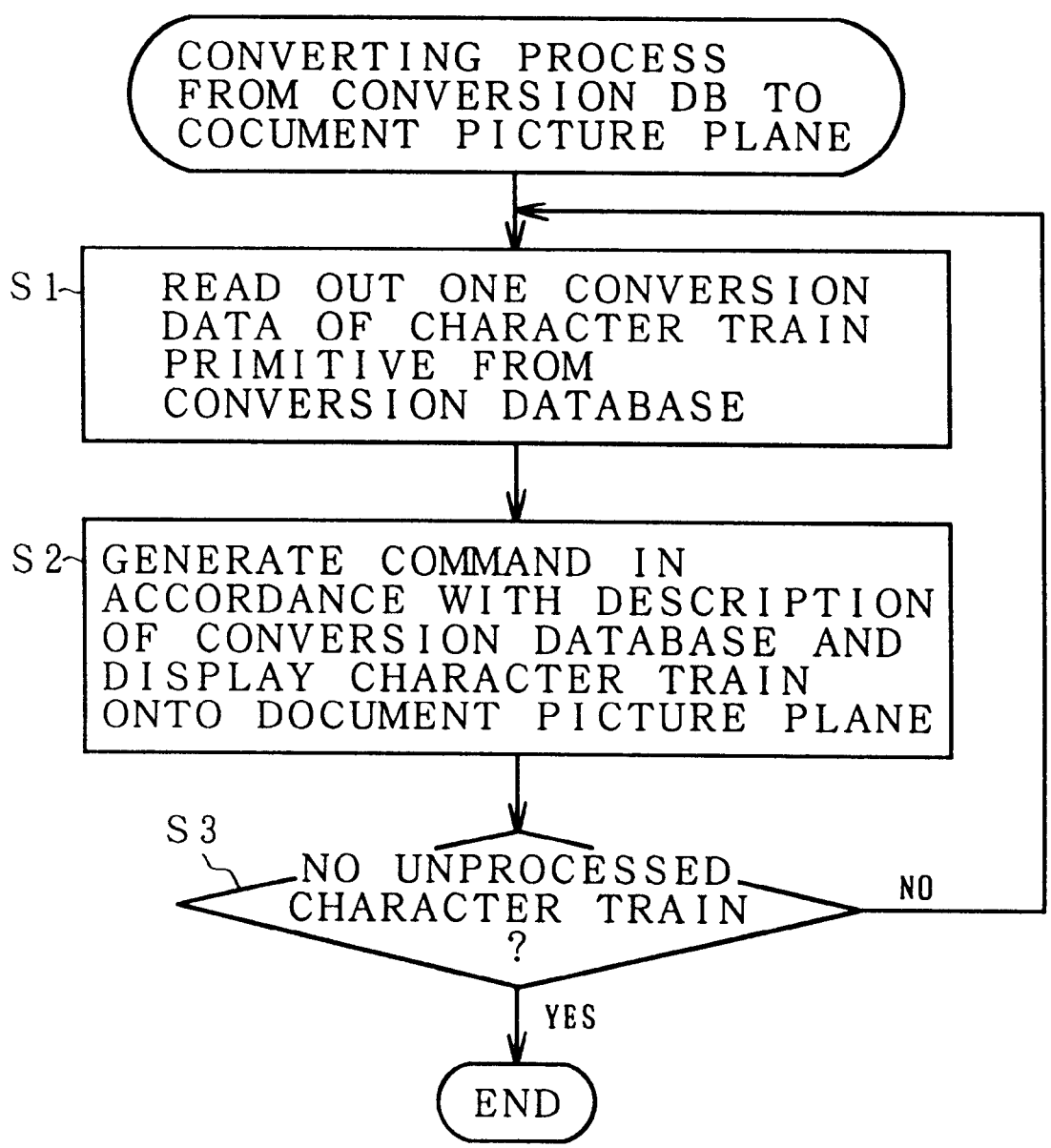
FIG. 14 is a flowchart for a converting process from a conversion database to a document picture plane.

FIG. 14 is a detailed flowchart for a converting process by the CAD information converting module 40 of the document side converting module 18 for converting from the conversion database 16 in FIG. 3 to the information that can be expressed by the word processing module 22. First in step S1, the data as much as one character train primitive, namely, the character train primitive information 38 in FIG. 4 is read out from the conversion database 16. In step S2, a WORD macro as a conversion command according to the description in the conversion database 16 is generated and is converted into document character train information that can be expressed on the document picture plane, and the character train is displayed on the document picture plane. The processes in steps S1 and S2 are repeated until there is no unprocessed character train in step S3.

Figure 15:
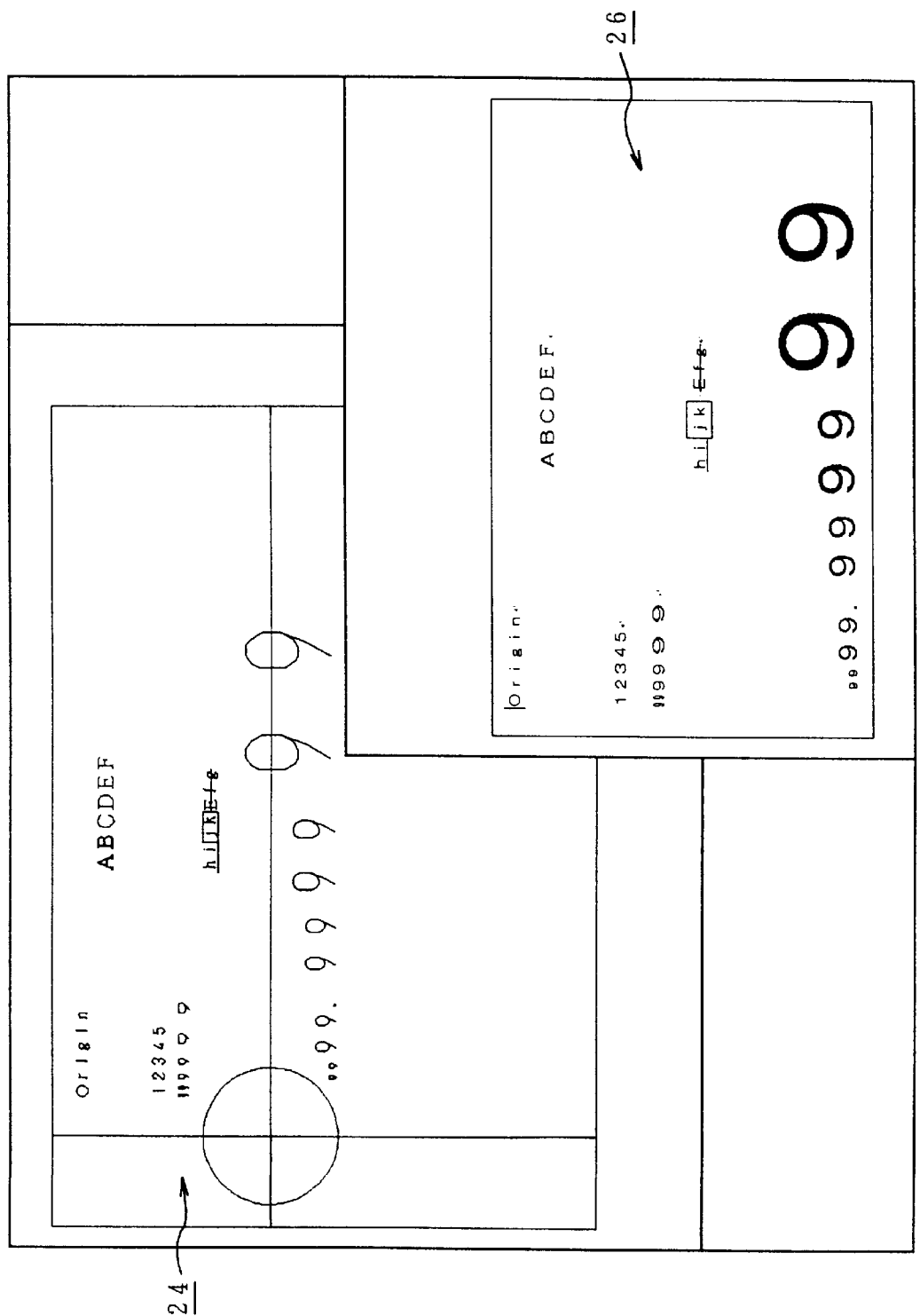
FIG. 15 is an explanatory diagram of a picture plane of a character train conversion from the CAD picture plane to the document picture plane according to FIG. 14.
Figure 16:
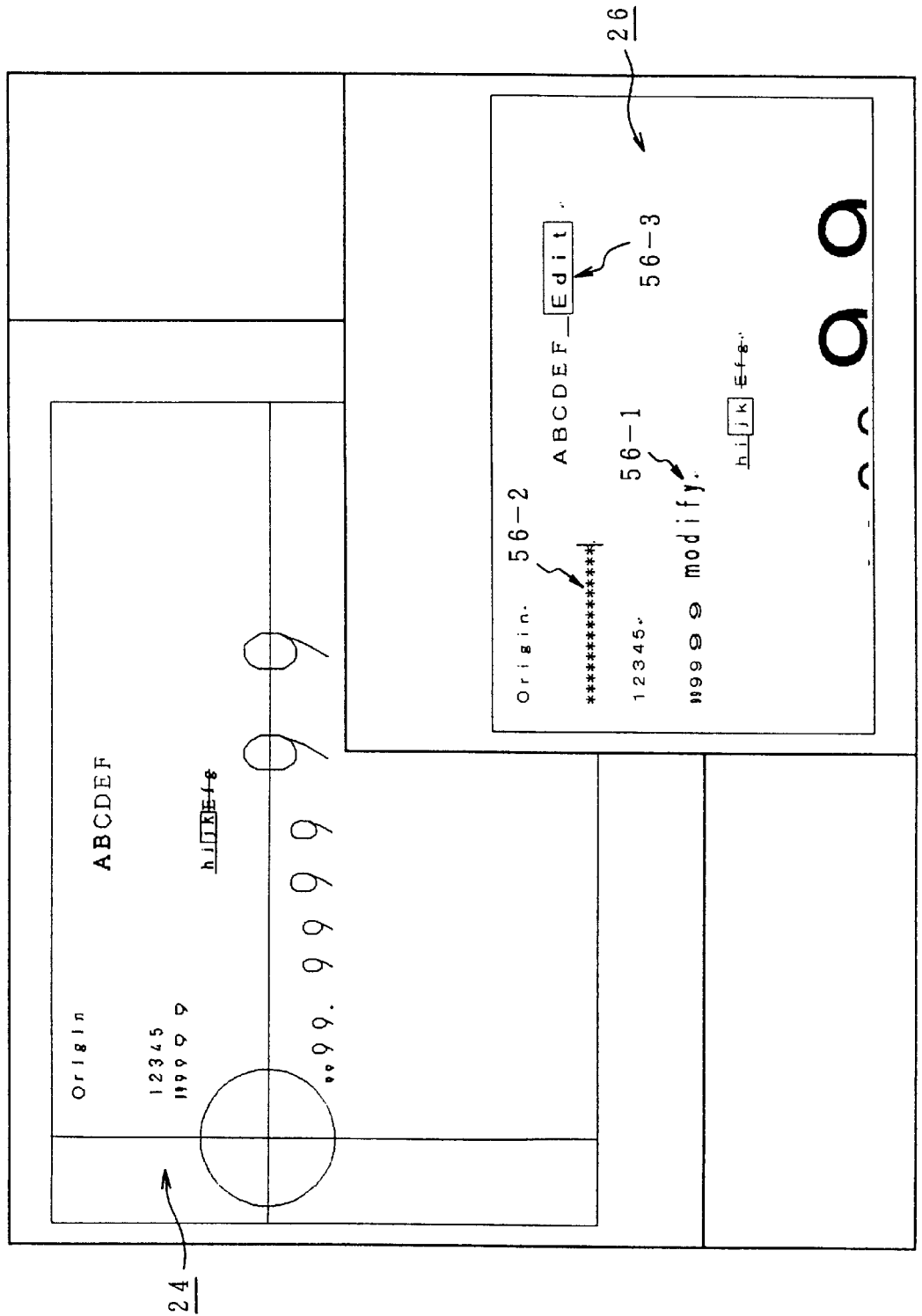
FIG. 16 is an explanatory diagram of a document picture plane during the edition.

FIG. 15 shows a state in which the information is extracted from the CAD picture plane 24 through the converting processes in FIGS. 13 and 14 and displayed on the document picture plane 26. The editing process is started for the document picture plane 26, as a target, which was converted and displayed as mentioned above. FIG. 16 shows the processing picture plane during the edition. With respect to the character train primitive on the CAD picture plane which was converted and displayed on the document picture plane 26, an editing process for inputting, for example, additional character trains 56-1, 56-2, and 56-3 is executed.

Figure 17:
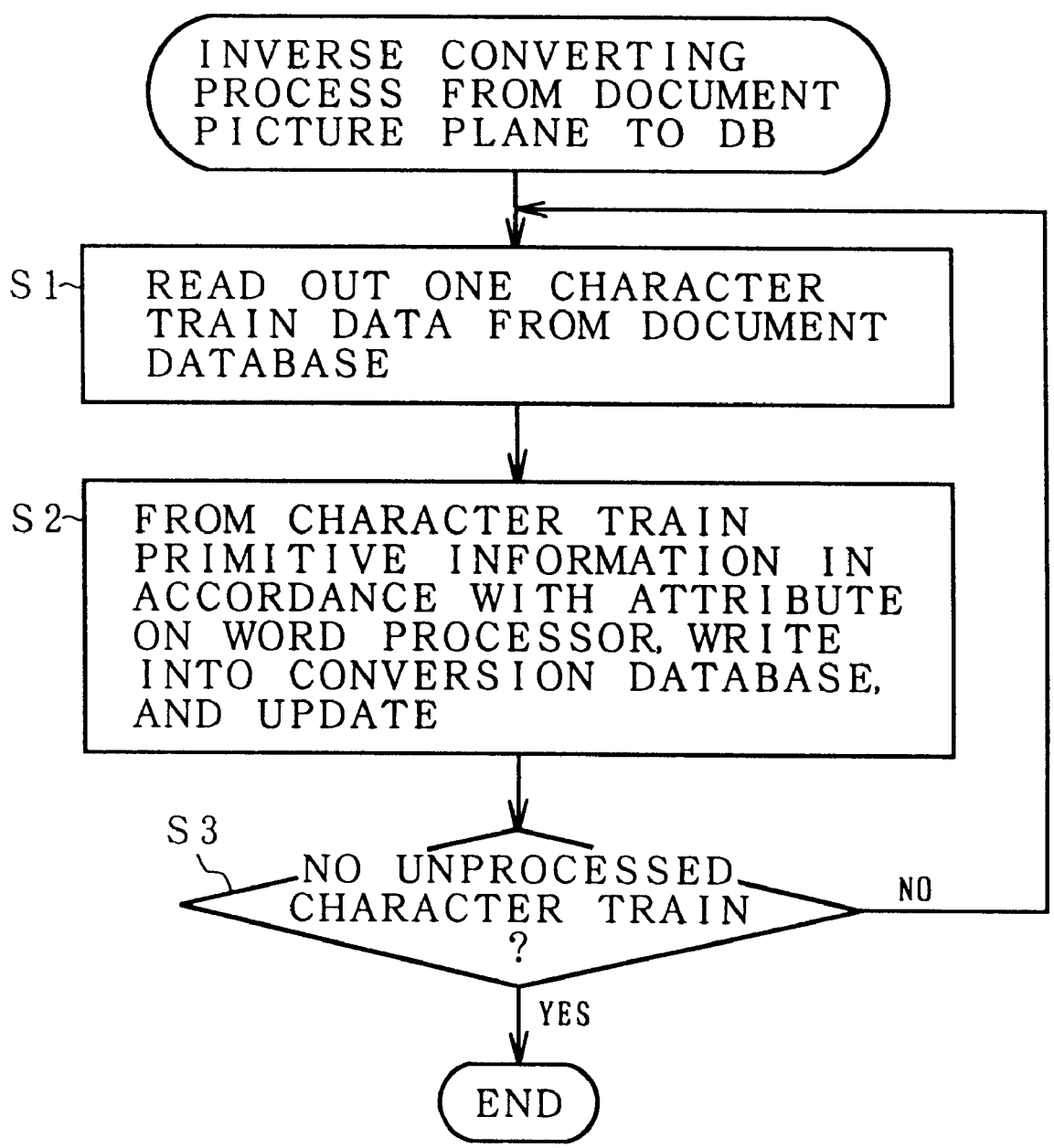
FIG. 17 is a flowchart for an inverse converting process from a document picture plane to a conversion database.

FIG. 17 is a flowchart for an inverse converting process by the document information converting module 42 which is provided for the document side converting module 18 in FIG. 3 and inversely converts the edited character train for the conversion database 16 after completion of the editing process on the document picture plane. In the inverse converting process, first in step S1, one character train data is read out from the document database in which the edition result has been stored. In step S2, the information is converted into the character train primitive information that can be expressed on the CAD picture plane in FIG. 4 and formed in accordance with the attributes on the word processing module 22. The character train primitive information 38 is written into the corresponding character train primitive information in the conversion database 16 and is updated. The processes in steps S1 and S2 are repeated until there is no unprocessed character train in step S3.

Figure 18:
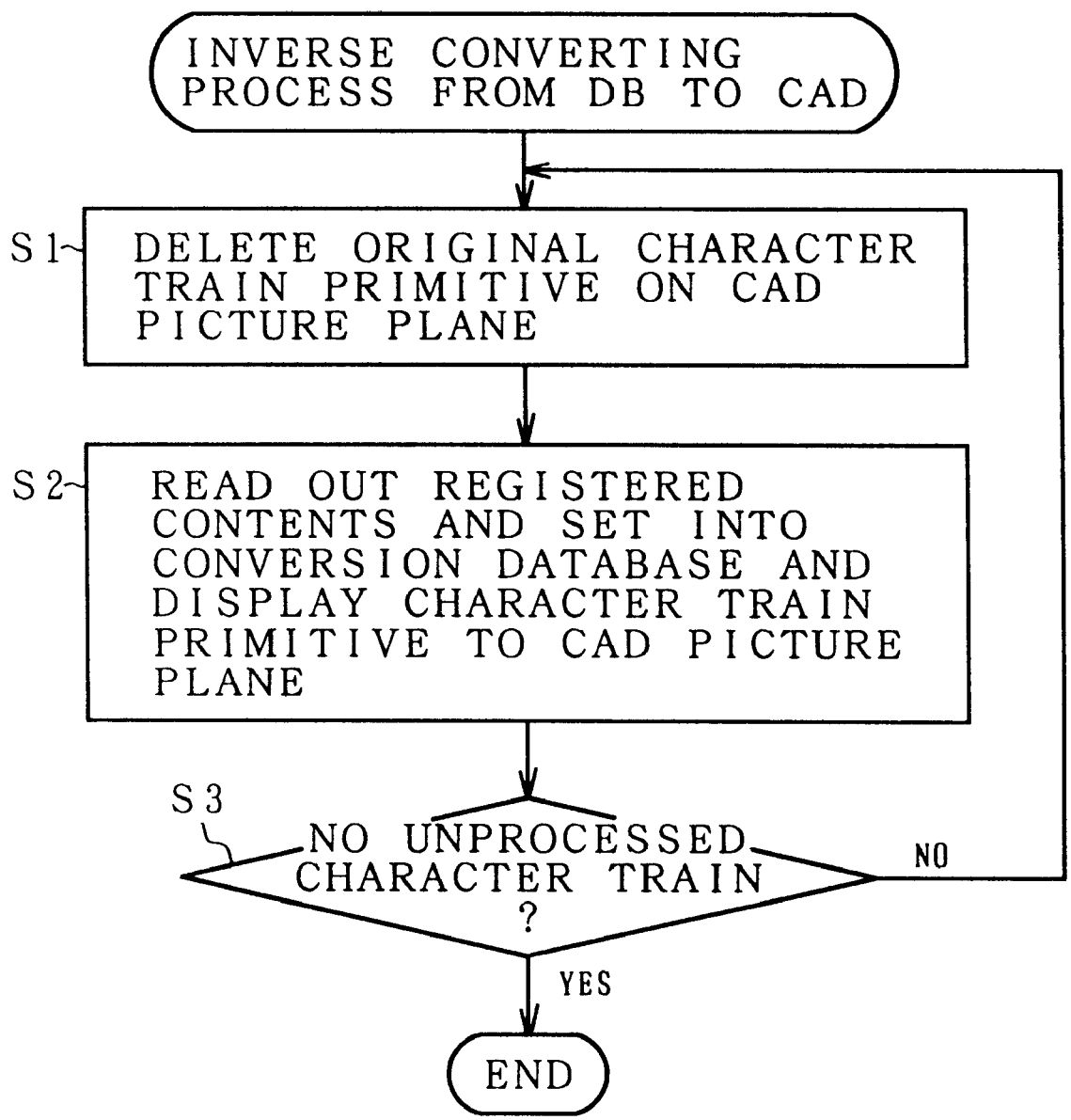
FIG. 18 is a flowchart for an inverse converting process from a conversion database to a CAD picture plane.

FIG. 18 is a flowchart for an inverse converting process by the CAD information reconstructing module 32 provided for the CAD side converting module 14. In the inverse converting process, after completion of the updating by the writing of the edited character train primitive information into the conversion database 16 in FIG. 3 by the document information converting module 42 of the document side converting module 18, it is inversely converted and reconstructed and displayed on the CAD picture plane. In the inverse converting process, first in step S1, the original character train primitives on the CAD picture plane are deleted. In step S2, one character train primitive is displayed on the CAD picture plane by using the updated character train primitive information 38 and the basic information 36 regarding the rectangular region which have been registered in the conversion database 16. The processes in steps S1 and S2 are repeated until there is no unprocessed character train in the conversion database 16 in step S3.

Figure 19:
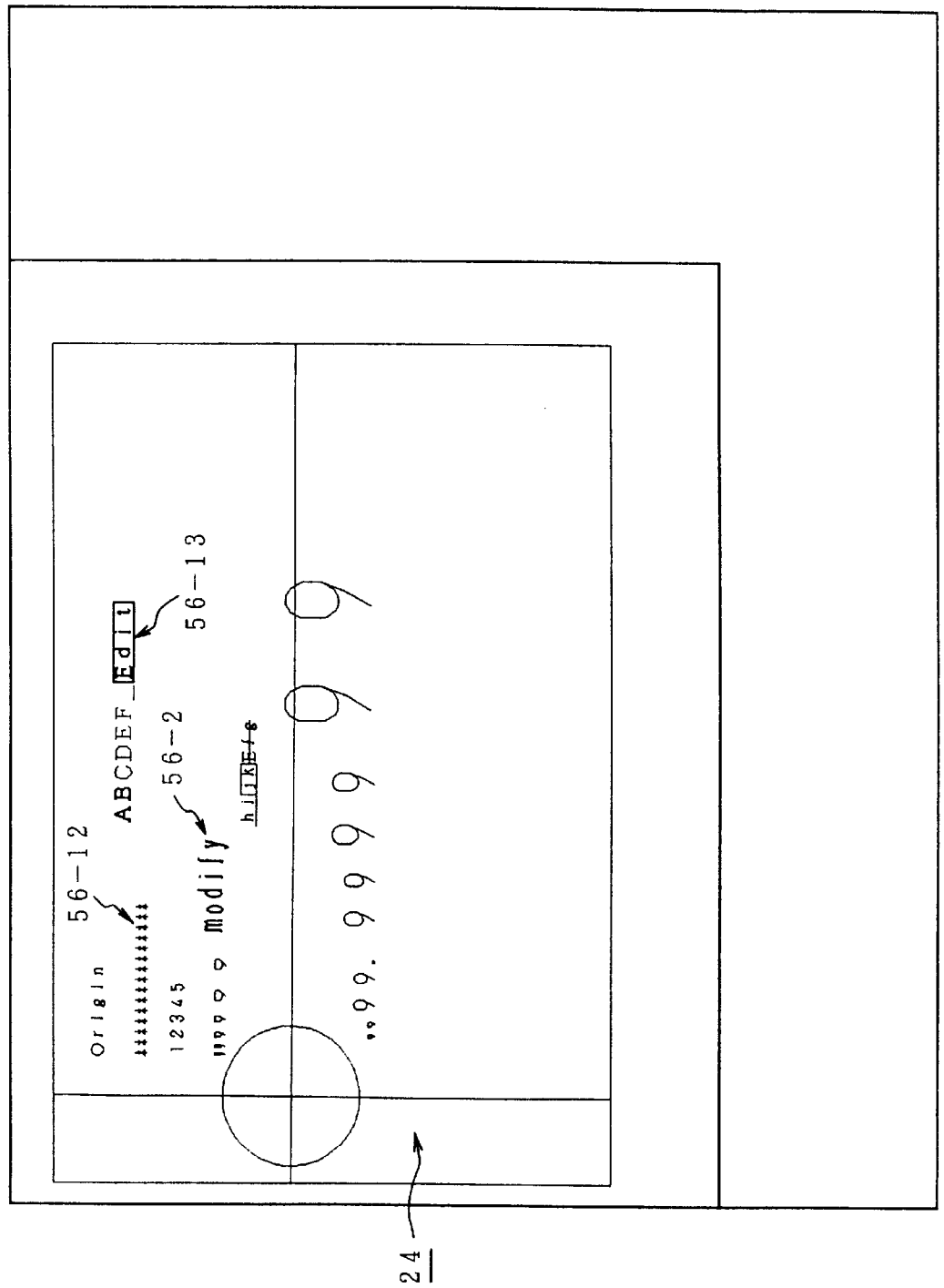
FIG. 19 is an explanatory diagram of a picture plane when the document picture plane in FIG. 18 is returned to the CAD picture plane.

FIG. 19 shows a display state of the edition result of the character train primitive returned to the CAD picture plane 24 by the inverse converting processes in FIGS. 17 and 18. By selecting and designating the character train primitive on the CAD picture plane 24 as necessary, the information is converted and displayed on the document picture plane. The input editing process effectively utilizing the powerful document input and editing function of the word processing module 22 is executed and the resultant information can be again returned to the character train primitive on the CAD picture plane 24.

[Animation process]

Figure 20:
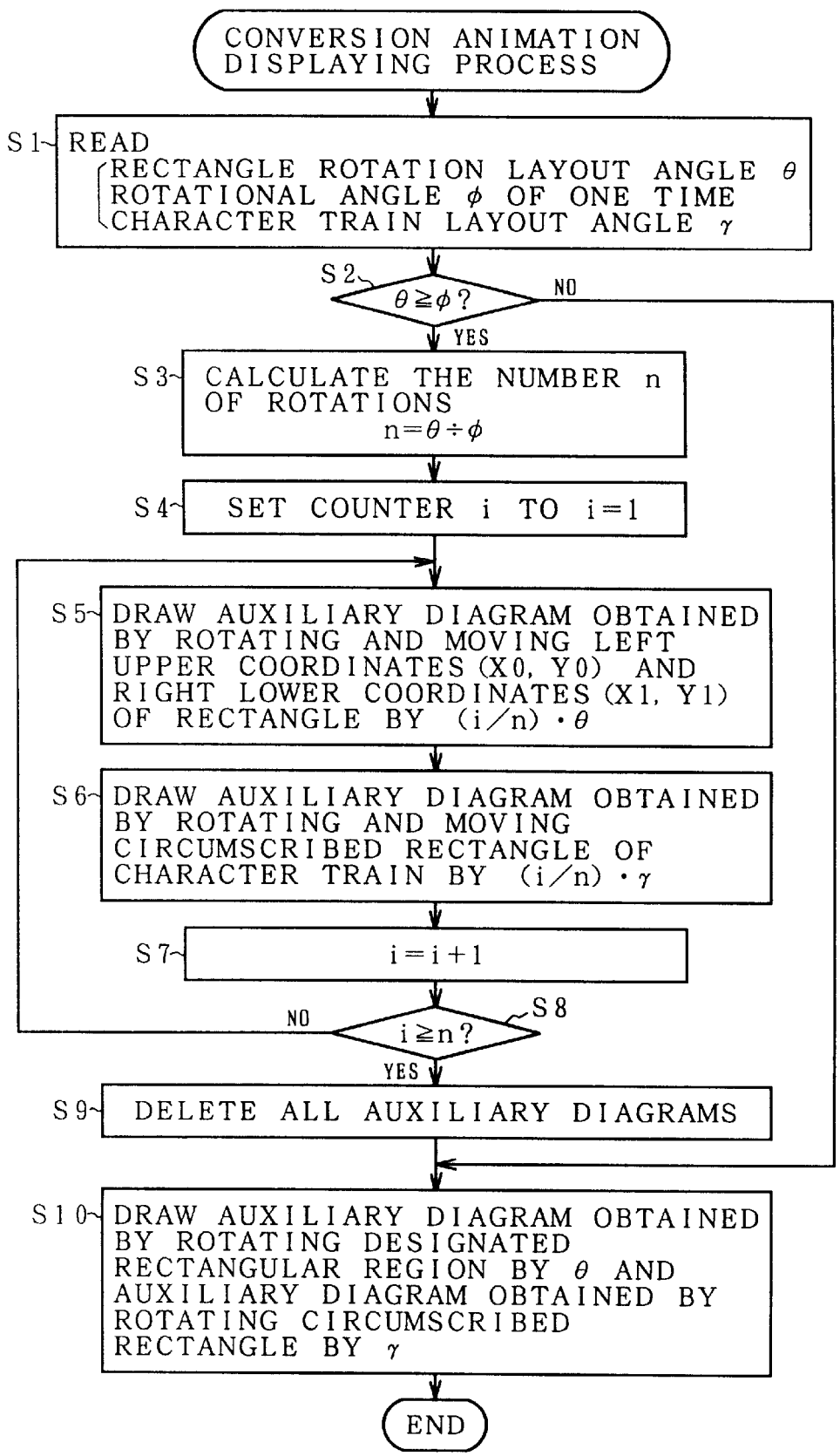
FIG. 20 is a flowchart for a conversion animation displaying process of the invention.
Figure 21:
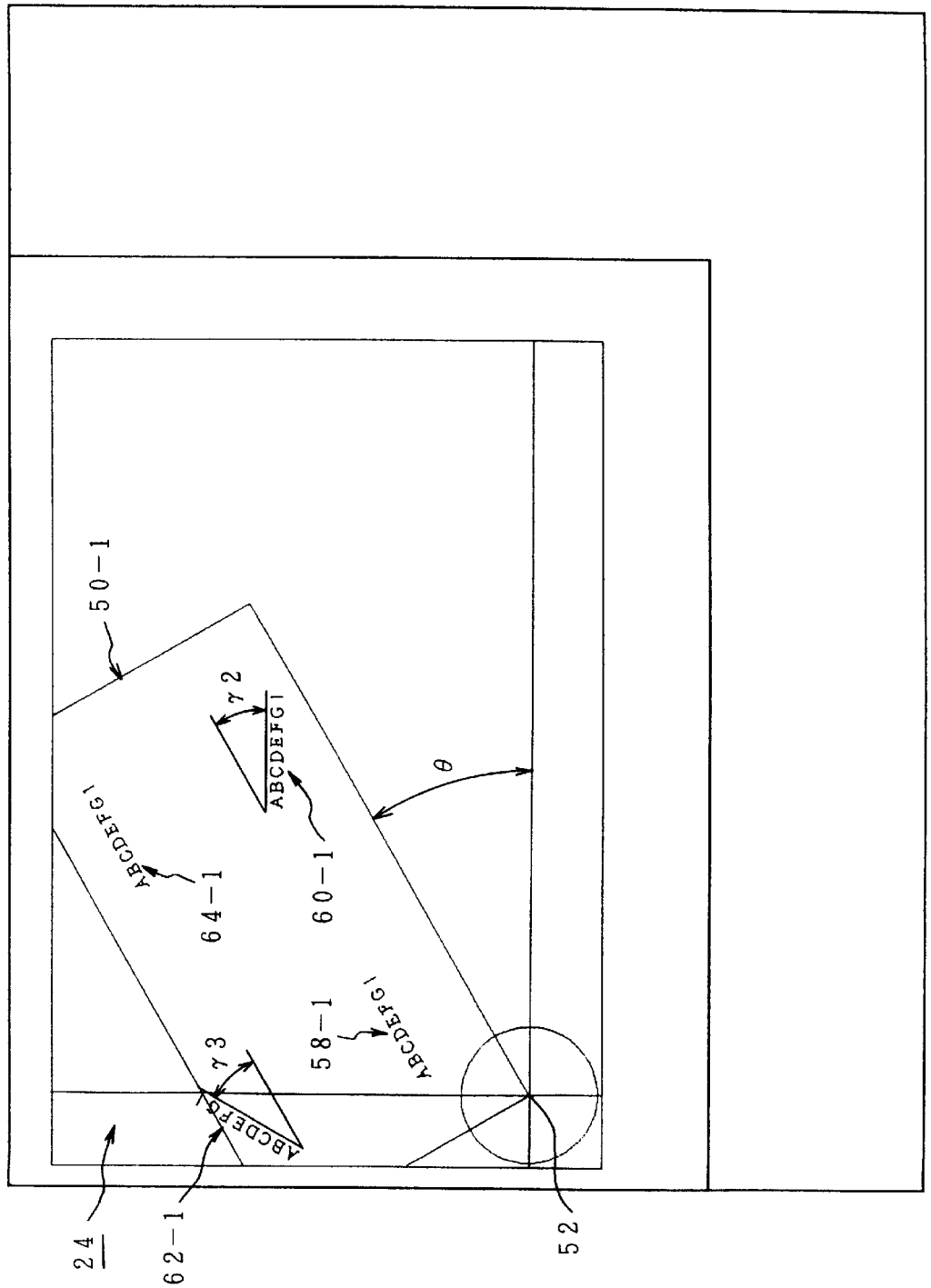
FIG. 21 is an explanatory diagram of a setting state of a rectangular region of the CAD picture plane.
Figure 22:
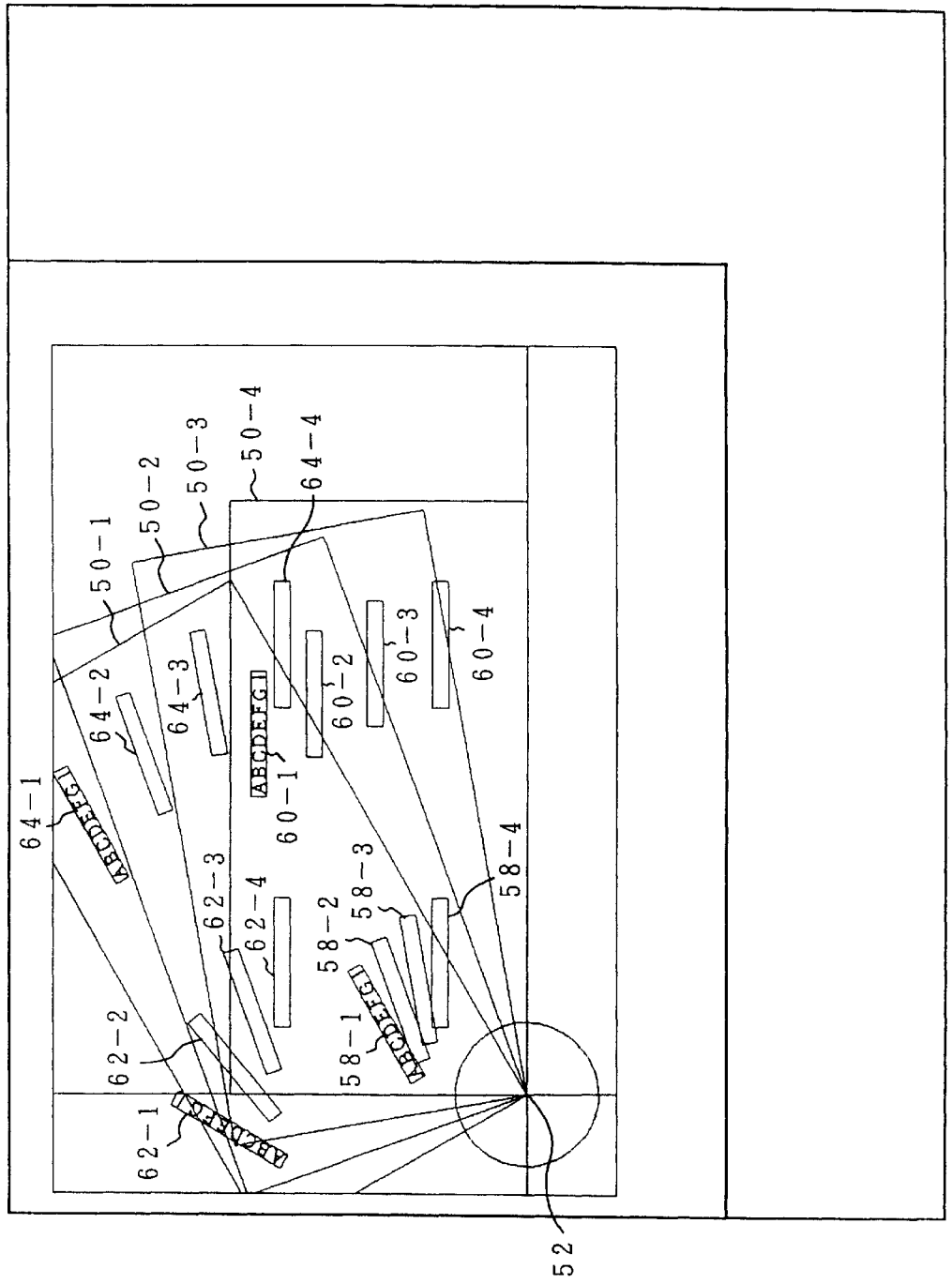
FIG. 22 is an explanatory diagram of the animation display according to FIG. 20.
Figure 23:
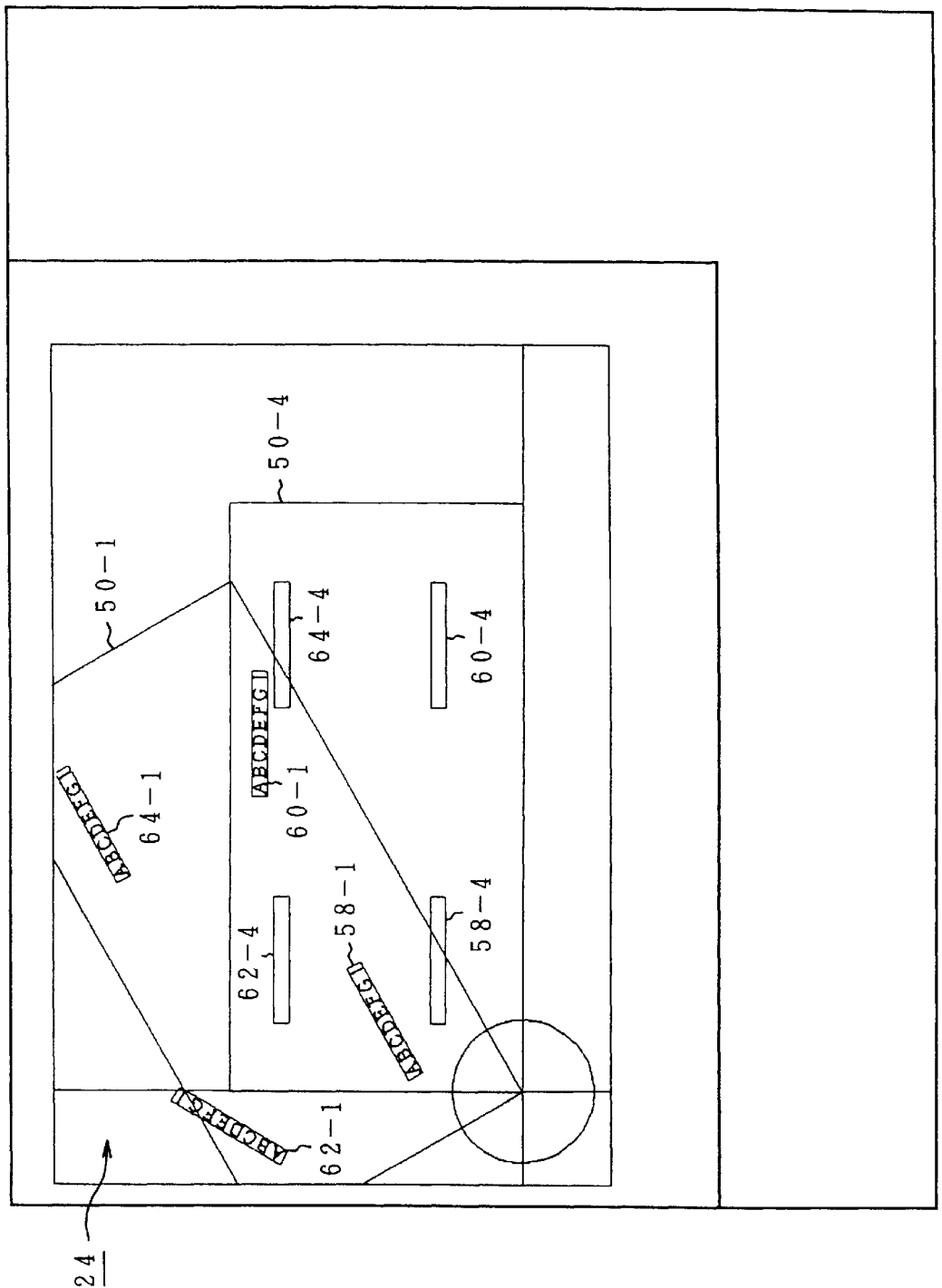
FIG. 23 is an explanatory diagram of an animation end picture plane in FIG. 20.

FIG. 20 is a flowchart for a conversion animation displaying process at the time of a character train conversion on the CAD picture plane by the animation processing module 34 provided for the CAD side converting module 14 in FIG. 3. According to the conversion animation displaying process, for example, when the rectangular region 50 is set for the CAD picture plane 24 as shown in FIG. 21, an animation to rotate clockwise the rectangular region 50 around the rotational center 52 by only the rectangle rotation layout angle θ step by step is displayed. Specifically speaking, the animation is displayed by both of a stepwise rotational display of rectangular region auxiliary diagrams 50-1 to 50-4 as shown in FIG. 22 and a stepwise rotational display of character train rectangular region auxiliary diagrams 58-1 to 58-4, 64-1 to 64-4 existing in the rectangular region auxiliary diagrams 50-1 to 50-4. Finally, after completion of the rotation, as shown in FIG. 23, the rectangular region auxiliary diagram 50-4 corresponding to the layout state of the document picture plane on the word processing module 22 side and the character train rectangular region display auxiliary diagrams 58-1 to 64-4 are displayed. Subsequently, as shown in FIG. 24, the screen is switched to a window display of the document picture plane 26 by the activation of the word processing module 22 and converted character trains 58, 60, 62, and 64 are displayed in the document picture plane 26.

Such an animation of the conversion display of the character trains to the CAD picture planes from FIG. 21 to FIG. 26 will now be described with reference to FIG. 20. First in step S1, the rectangle rotation layout so angle θ of the rectangular region 50 set in the CAD picture plane 24 in FIG. 21, a predetermined rotational angle φ of one time of the animation stepwise display, and further, character train layout angles γ1 to γ4 in the character train primitives 58-1 to 64-1 are read. The character train layout angles are set to γ2 in case of the character train primitive 61-1 and to γ3 in case of the character train primitive 62-1. The angles γ1 and γ4 of the character train primitives 58-1 and 64-1 are equal to 0°, respectively. In step S2, a check is made to see whether the rectangle rotation layout angle θ is equal to or larger than the animation rotational angle φ of one time or not. When the rectangle rotation layout angle θ is smaller than the animation rotational angle φ of one time, the animation process is not performed. When the rectangle rotation layout angle θ is equal to or larger than the animation rotational angle φ of one time, step S3 follows and the number (n) of times of rotation of animation is calculated by setting n=θ÷φ. In step S4, a counter i indicative of the number of processing times is set to i=1. Subsequently, in step S5, an auxiliary diagram in which the left upper coordinates (X0, Y0) and right lower coordinates (X1, Y1) of the rectangular region were rotated and moved by an angle of (i/n2)×θ obtained by using a value of the counter (i) at that time is drawn. Namely, the rectangular region auxiliary diagram 50-2 in FIG. 22 is drawn. In step S6, an auxiliary diagram in which a circumscribed rectangle of each character train was rotated and moved by only an angle of (i/n)×γ is drawn. That is, the character train outer frame auxiliary diagrams 58-2 to 64-2 included in the rectangular region auxiliary diagram 50-2 in FIG. 22 are drawn. In this instance, as for the character train outer frame auxiliary diagrams 58-1 and 64-1, since γ1 and γ4 are equal to 0°, there is no change in relative rotating position for the rectangular region auxiliary diagram 50-2. On the other hand, as for the character train outer frame auxiliary diagrams 60-1 and 62-1, as shown in FIG. 21, since they have effective values of the character train layout angles γ2 and γ3 other than 0°, a character train rotation toward a peculiar rectangular region horizontal line of every character train for relatively setting γ2/n and γ3/n is executed for the rectangular region auxiliary diagram 50-2. In step S7, the counter (i) is counted up by 1. Until the count value reaches the number (n) of times of rotation in step S8, the drawing processes of the rectangular auxiliary diagrams and character train outer frame auxiliary diagrams in steps S4 to S6 are repeated. Thus, for example, an animation drawing as shown in FIG. 22 is carried out step by step. The processing routine advances to step S9 and all of the auxiliary diagrams in FIG. 22 are deleted. In step S10, the auxiliary diagram 50-4 in which the rectangular region designated as shown in FIG. 23 was rotated by an angle θ and the auxiliary diagrams 58-4 to 64-4 in which the circumscribed rectangles of the respective character trains were rotated by an angle γ are drawn. A series of animation display processes are finished.

Figure 24:
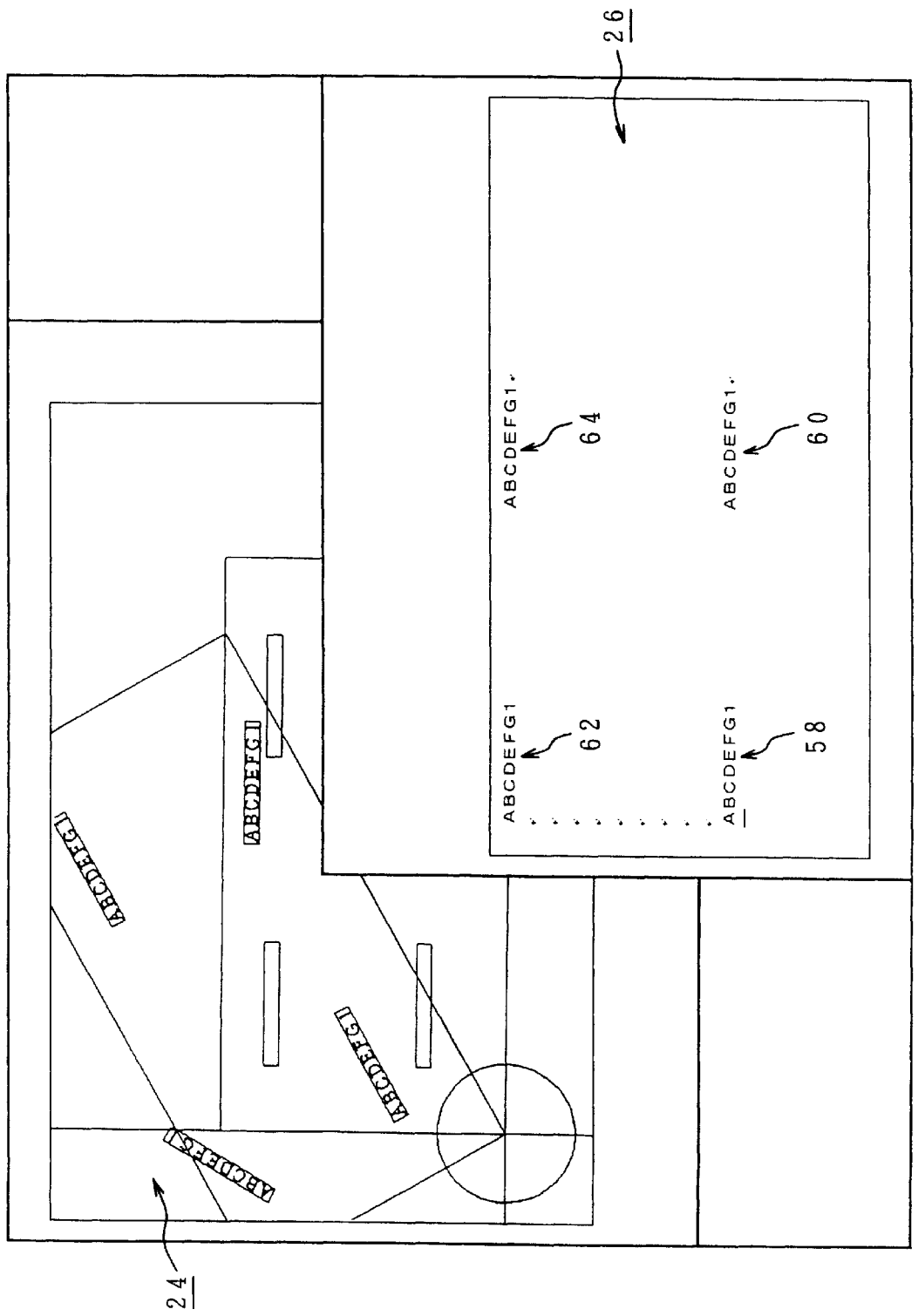
FIG. 24 is an explanatory diagram when a document picture plane is activated after completion of the animation.

As compared with a difficulty of the correspondence relation of the character trains in the different layout directions of both of the CAD picture plane 24 and the document picture plane 26 in the case where the screen is directly switched from the CAD picture plane 24 to the document picture plane 26 in FIG. 24 without performing the animation display, by the stepwise animation display of the rotation change to the layout state of the picture plane of the word processor serving as a conversion destination of the character trains on the CAD picture plane according to the invention, a converting procedure from the layout state of the CAD picture plane to the layout state of the document picture plane 26 is easily known. The correspondence relation with the character train primitives of the CAD picture plane 24 is accepted to the user without a feeling of physical disorder. The input editing work in the document picture plane 26 can be efficiently performed. In the processes of FIG. 20, a rotation change of the rectangular region when converting from the CAD picture plane to the document picture plane is animation displayed. However, on the contrary, even with respect to the inverting conversion for returning the character trains from the document picture plane 26 in FIG. 24 after completion of the edition to the CAD picture plane 24, it is also possible to construct such that a state in which the screen is returned as shown in FIG. 22 while setting FIG. 23 to the initial state is animation displayed, thereby finally returning the screen to the CAD picture plane 24 in FIG. 21.

[Reflecting process to CAD picture plane during edition]

Figure 25:
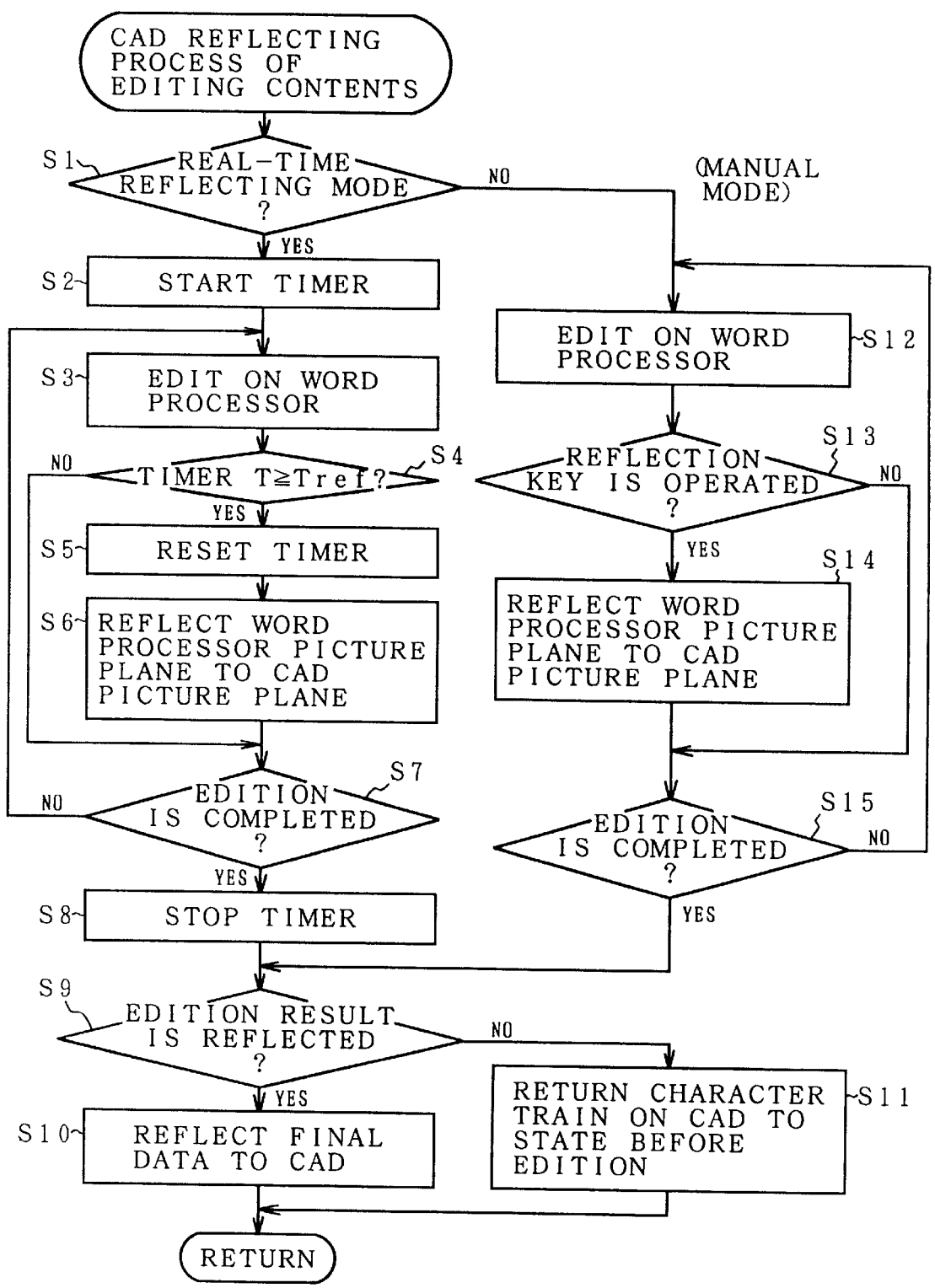
FIG. 25 is a flowchart for a CAD reflecting process which is executed during the edition of a document picture plane.

FIG. 25 is a flowchart for a reflecting process to the CAD picture plane during the edition in the document picture plane by the CAD reflection processing module 44 provided on the document side converting module 18 side in FIG. 3. In the reflecting process to the CAD picture plane, when the editing process using the document picture plane is performed, either a real-time reflecting process or a manual reflecting process can be selected. In step S1, when it is determined to be a real-time reflecting mode, a timer is activated in step S2. An input editing process on the word processor is executed in step S3. In step S4, a time-up is decided when a timer T reaches a predetermined time Tref, for instance, Tref=30 seconds, the timer is reset in step S5. After that, in step S6, the character trains on the document picture plane 26 are reflected to the CAD picture plane 24 by the inversion converting process. In the reflecting process in step S6, if the conversion information before edition which has been stored in the conversion database 16 is rewritten, the character train primitive before edition cannot be reconstructed. Therefore, it is desirable to separately provide a work area on the conversion database 16, execute a converting process using the document information converting module 42 for the work area by the reflection processing module 44, and reflect and display to the CAD picture plane side. In step S7, a check is made to see if the edition has been completed. When the completion of the edition is decided, step S8 follows and the timer is stopped. In step S9, whether an edition result is reflected or not is inquired to the user. In case of reflecting, step S10 follows and the final data is reflected to the CAD side. Specifically speaking, the corresponding character train primitive information before edition which has been stored in the conversion database 16 is rewritten and updated by the character train primitive information which was inversely converted from the character train after completion of the edition. In step S9, when it is determined that the edition result is not reflected, in step S11, the character train primitive information for reflection stored in the work area in the conversion database 16 is deleted, the corresponding character train primitive information held at the start of the conversion in the conversion database 16 is read out, and the character train primitives on the CAD picture plane are returned to the state before edition. When a manual reflecting mode is selected in step S1, the editing process on the document picture plane is performed in step S12. A check is made in step S13 to see if a reflection key has been operated. When it is determined that the reflection key has been operated on the document picture plane, step S14 follows and the character train on the document picture plane is inversely converted and reflected onto the CAD picture plane. In this case as well, the character train primitive information before edition which has been stored in the conversion database 16 is not rewritten and updated. The character train primitive information which was inversely converted from the character train during the edition on the document picture plane is written into the work area and is reflected and displayed onto the CAD picture plane. When the completion of the edition is decided in step S15, in a manner similar to the case of the real-time reflecting mode, a check is made in step S9 to see if the edition result is reflected. In case of reflecting the edition result, the final data is reflected onto the CAD picture plane in step S10. When the edition result is not reflected, the character train is returned to the character train before edition in step S11.

FIG. 26 shows a reflecting state to the CAD picture plane 24 during the edition by the document picture plane 26 in the real-time reflecting mode in FIG. 25. When an editing process to add the character train primitives 56-1 to 56-3 is executed on the document picture plane 26, the result is immediately displayed on the CAD picture plane 24 as reflection character train primitives 56-11 to 56-13. Thus, while performing the edition on the document picture plane 26, how the edition contents are arranged on the CAD picture plane 24 in a real-time manner can be immediately known. An efficient editing work that is equivalent to that the character train is directly edited on the CAD picture plane 24 can be realized.

According to the invention as mentioned above, a plurality of character train primitives existing on the CAD picture plane are simultaneously designated and converted and displayed onto the document picture plane of the application such as word processor or text editor that is exclusively used for a document process and the input and edition can be substituted. The input and editing work of the character train primitives to the CAD picture plane effectively using the powerful character input and editing function of the application exclusively for the document process can be realized and a working efficiency can be remarkably improved. During the edition in which the character train primitives on the CAD picture plane are converted and displayed onto the document picture plane, the edition contents can be reflected to the character train primitives on the CAD picture plane in a real-time manner or by the operation of the user. The contents of the editing work on the document picture plane of different character train layout states are immediately reflected to the character train primitives on the CAD picture plane and the input and edition result can be easily grasped. The character train input and editing work can be efficiently carried out with an operation feeling that is equivalent to that the character train primitives are directly inputted and edited onto the CAD picture plane. Further, when the character train primitives on the CAD picture plane are converted and displayed onto the document picture plane, with respect to the auxiliary diagram of the rectangular region to designate the conversion target region on the CAD picture plane and the outer frame auxiliary diagram of the character train primitives in the rectangular region, a state in which they are rotated and moved to the layout state of the document picture plane is drawn as an animation. Therefore, the correspondence relation between the CAD picture plane and the character trains in the document picture plane having different layout states can be easily known to the user. The input and editing work of the character train when it is converted and displayed on the document picture plane can be easily performed. Thus, a working burden on the user to input and arrange the character train primitives onto the CAD picture plane is remarkably reduced. An efficiency of the CAD character train editing work can be extremely improved.

The above embodiment has been shown and described with respect to an example of the computer environment in which the CAD software module and the word processing module can simultaneously operate. However, a text editing module that is exclusively used for edition can be also used in place of the word processing module. The character train primitive information which is used to express the character train primitives on the CAD picture plane and the document character train information that is expressed on the document picture plane of the word processing module or text editing module are not limited to the items in the embodiment but proper parameters are used as necessary. The character train converting process of the invention is not limited by the numerical values shown in the embodiments.

What is claimed is:

1. An apparatus for editing a character train on a CAD picture plane, comprising:

a CAD processing module to input and arrange one or more character train primitives in a CAD description language at an arbitrary position on the CAD picture plane and at an arbitrary angle;

a document processing module to operate in a same environment as that of said CAD processing module, said document processing module to input and display one or more character trains in a document processing language to an arbitrary position on a document picture plane in a lateral or vertical writing direction or both of the lateral and vertical writing directions, and to edit the displayed character train on said document picture plane; and a character train converting module to convert the character train primitive in the CAD description language on said CAD picture plane into the character train in the document processing language on said document picture plane and to display and, to convert the character train in the document processing language on said document picture plane into the character train primitive in the CAD description language on said CAD picture plane and to display.

2. An apparatus according to claim 1, further comprising:

a CAD reflection processing module to reflect edition contents on said document picture plane to the character train primitive on said CAD picture plane while the displayed character train from the character train primitive on said CAD picture plane is being edited on said document picture plane.

3. An apparatus according to claim 2, wherein said reflection processing module automatically reflects the edition contents of said document picture plane onto said CAD picture plane every preset time.

4. An apparatus according to claim 2, wherein said reflection processing module reflects the edition contents onto said CAD picture plane on the basis of a reflecting operation on said document picture plane.

5. An apparatus according to claim 1, wherein said character train converting module comprises:
   a rectangular region setting module to set an arbitrary rectangular region including the character train primitive as an edition target on said CAD picture plane;
   a CAD information extracting module to extract each of basic information including layout information of said rectangular region on the CAD picture plane, CAD layout information of the character train primitives existing in said rectangular region, and a character code train and CAD character train attribute information and a character code train which are used to express the character train primitive on said CAD picture plane and to store into a conversion database;
   a CAD information converting module to convert the CAD layout information of said character train primitive and the CAD character train attribute information which were stored in said conversion database into document layout information and document character train attribute information on said document picture plane and to display the character train corresponding to the character code train of said character train primitive stored in said conversion database onto said document picture plane by said document processing module;
   a document information converting module to extract the document layout information and the character code train on said document picture plane from the character train on said document picture plane, to update the CAD layout information and the character code train of said character train primitive stored in said conversion database, to extract the document character train attribute information from the character train on said document picture plane, to convert into the CAD character train attribute information, and after that, to update the CAD character train attribute information of said character train primitive stored in said conversion database; and
   a CAD information reconstructing module to read out said basic information, said CAD layout information, said CAD character train attribute information, and said character code train stored in said conversion database and to display the character train primitive corresponding to the character train edited by said document processing module onto said CAD picture plane.

6. An apparatus according to claim 5, wherein said rectangular region setting module sets the rectangular region including the character train primitive on the basis of a designation of rectangle left upper coordinates, rectangle right lower coordinates, and a rectangle layout angle θ on said CAD picture plane.

7. An apparatus according to claim 5, wherein when a plurality of character train primitives as editing targets are designated on said CAD picture plane, said rectangular region setting module sets a circumscribed rectangular region including all of the designated character train primitives.

8. An apparatus according to claim 5, wherein
the rectangular region layout information included in the basic information that is extracted by said CAD information extracting module includes said rectangle layout angle θ, said rectangle left upper coordinates, and said rectangle right lower coordinates set by said rectangular region setting module, and said basic information includes a reduction conversion coefficient in which a conversion reduction between a character size of the CAD picture plane and a character size of the document picture plane is defined and designation information of a rotational center point when the character train primitive arranged on said CAD picture plane with the arbitrary angle is converted to a layout position on said document picture plane by a rotation.

9. An apparatus according to claim 5, wherein
said CAD character train layout information that is extracted by said CAD information extracting module includes a character position, a character size, a character thickness, a character interval, a relative character train layout angle in which said rectangular region is set to a reference, and a character inclination angle of said character train primitive, said CAD information converting module converts the character position, character size, character thickness, and character interval of said character train primitive in said CAD layout information into a character position, a character size, a character thickness, and a character interval of the corresponding character train on said document picture plane and converts said character train layout angle and character inclination angle into a hidden character which is added to said character code train and is not used for display onto said document picture plane, and said document information converting module converts the character position, character size, and character thickness of the character train on said document picture plane into a character position, a character size, and a character thickness of the corresponding character train on said CAD picture plane and converts the hidden character added to said character code train into said character train layout angle and said character inclination angle on said CAD picture plane.

10. An apparatus according to claim 5, wherein
the CAD character train attribute information which is extracted by said CAD information extracting module includes a decoration attribute such as surrounding character, underline, overline, correction line, or the like, a character color, an aspect ratio of a character, an enlargement/reduction attribute, and a suffix attribute such as superscript, subscript, or the like, said CAD information converting module converts each of the decoration attribute, character color, aspect ratio of the character, enlargement/reduction attribute, and suffix attribute included in said CAD character train attribute information into a decoration attribute, a character color, an aspect ratio of the character, an enlargement/reduction attribute, and a suffix attribute of the corresponding character train on said document picture plane, and said document information converting module converts the decoration attribute, character color, aspect ratio of the character, enlargement/reduction attribute, and suffix attribute of the character train on said document picture plane into a decoration attribute, a character color, an aspect ratio of the character, an enlargement/reduction attribute, and a suffix attribute of the corresponding character train on said CAD picture plane.

11. An apparatus according to claim 5, wherein said character train converting module has an animation processing module constructed in a manner such that when the rectangular region including the character train primitive as a conversion target on said CAD picture plane is set by said rectangular region setting module and the converting process onto said document picture plane is started, a state in which said rectangular region having an arbitrary angle on said CAD picture plane is rotated and converted toward a layout form of said document picture plane is displayed by an animation.

12. An apparatus according to claim 11, wherein said animation processing module obtains the number (n) of images in which layout angle θ of the rectangular region set on said CAD picture plane is divided by a rotational angle φ of a predetermined animation display, forms an auxiliary diagram indicative of said rectangular region every said rotational angle φ, displays a stepwise change in rotating position, forms an auxiliary diagram of a rectangular frame surrounding said character train primitive synchronously with the display of said auxiliary diagram of said rectangular region every stepwise rotation in which a layout angle γ of said character train primitive is divided by said number (n) of images, and displays said auxiliary diagram step by step.

13. A method of editing a character train on a CAD picture plane, comprising:

a CAD processing step of inputting and arranging one or more character train primitives in a CAD description language at an arbitrary position on said CAD picture plane and at an arbitrary angle;

a document processing step of operating in a same environment as that in said CAD processing step, inputting and displaying one or more character trains in a document processing language to an arbitrary position on a document picture plane in a lateral or vertical writing direction or both of the lateral and vertical writing directions, and editing the displayed character train on said document picture plane; and a character train converting step of converting the character train primitive in the CAD description language on said CAD picture plane into the character train in the document processing language on said document picture plane and displaying and, converting the character train in the document processing language on said document picture plane into the character train primitive in the CAD description language on said CAD picture plane and displaying.

14. A method according to claim 13, further comprising:

a CAD reflection processing step of reflecting edition contents on said document picture plane to the character train primitive on said CAD picture plane while the displayed character train from the character train primitive on said CAD picture plane is being edited on said document picture plane.

15. A method according to claim 13, wherein said character train converting step comprises:

a rectangular region setting step of setting an arbitrary rectangular region including the character train primitive as an edition target on said CAD picture plane;

a CAD information extracting step of extracting each of basic information including layout information of said rectangular region on the CAD picture plane, CAD layout information of the character train primitives existing in said rectangular region, CAD character train attribute information which is used to express the character train primitive on said CAD picture plane, and a character code train and storing into a conversion database;

a CAD information converting step of converting the CAD layout information of said character train primitive and the CAD character train attribute information which were stored in said conversion database into document layout information and document character train attribute information on said document picture plane and displaying the character train corresponding to the character code train of said character train primitive stored in said conversion database onto said document picture plane;

a document information converting step of extracting the document layout information and the character code train on said document picture plane from the character train on said document picture plane, updating the CAD layout information and the character code train of said character train primitive stored in said conversion database, extracting the document character train attribute information from the character train on said document picture plane, converting into the CAD character train attribute information, and after that, updating the CAD character train attribute information of said character train primitive stored in said conversion database; and a CAD information reconstructing step of reading out said basic information, said CAD layout information, said CAD character train attribute information, and said character code train stored in said conversion database and displaying the character train primitive corresponding to the character train edited in said document processing step onto said CAD picture plane.

16. A method according to claim 15, wherein said character train converting step has an animation processing step constructed in a manner such that when the rectangular region including the character train primitive as a conversion target on said CAD picture plane is set in said rectangular region setting step and the converting process onto said document picture plane is started, a state in which said rectangular region having an arbitrary angle on said CAD picture plane is rotated and converted toward a layout form of said document picture plane is displayed by an animation.

17. A storage medium in which a program to edit a character train on a CAD picture plane has been stored, comprising:

a CAD processing module to input and arrange one or more character train primitives in a CAD description language at an arbitrary position on the CAD picture plane and at an arbitrary angle;

a document processing module to operate in a same environment as that of said CAD processing module, to input and display one or more character trains in a document processing language to an arbitrary position on a document picture plane in a lateral or vertical writing direction or both lateral and vertical writing directions, and to edit the displayed character train on said document picture plane; and a character train converting module to convert the character train primitive in the CAD description language on said CAD picture plane into the character train in the document processing language on said document picture plane and to display and, to convert the character train in the document processing language on said document picture plane into the character train primitive in the CAD description language on said CAD picture plane and to display.

18. A medium according to claim 17, further comprising:

a CAD reflection processing module to reflect edition contents on said document picture plane to the character train primitive on said CAD picture plane while the displayed character train from the character train primitive on said CAD picture plane is being edited on said document picture plane.

19. A medium according to claim 17, wherein said character train converting module comprises:

a rectangular region setting module to set an arbitrary rectangular region including the character train primitive as an edition target on said CAD picture plane;

a CAD information extracting module to extract each of basic information including layout information of said rectangular region on the CAD picture plane, CAD layout information of the character train primitives existing in said rectangular region, CAD train attribute information which is used to character express the character train primitive on said CAD picture plane, and a character code train and to store into a conversion database;

a CAD information converting module to convert the CAD layout information of said character train primitive and the CAD character train attribute information which were stored in said conversion database into document layout information and document character train attribute information on said document picture plane and to display the character train corresponding to the character code train of said character train primitive stored in said conversion database onto said document picture plane by said document processing module;

a document information converting module to extract the document layout information and the character code train on said document picture plane from the character train on said document picture plane, to update the CAD layout information and the character code train of said character train primitive stored in said conversion database, to extract the document character train attribute information from the character train on said document picture plane, to convert into the CAD character train attribute information, and after that, to update the CAD character train attribute information of said character train primitive stored in said conversion database; and a CAD information reconstructing module to read out said basic information, said CAD layout information, said CAD character train attribute information, and said character code train stored in said conversion database and to display the character train primitive corresponding to the character train edited by said document processing module onto said CAD picture plane.

20. A medium according to claim 19, wherein said character train converting module has an animation processing module constructed in a manner such that when the rectangular region including the character train primitive as a conversion target on said CAD picture plane is set by said rectangular region setting module and the converting process onto said document picture plane is started, a state in which said rectangular region having an arbitrary angle on said CAD picture plane is rotated and converted toward a layout form of said document picture plane is displayed by an animation.

* * * * *